(12) United States Patent
Ellis et al.

(10) Patent No.: US 9,591,251 B2
(45) Date of Patent: Mar. 7, 2017

(54) INTERACTIVE TELEVISION PROGRAM GUIDE SYSTEM WITH OPERATOR SHOWCASE

(75) Inventors: Michael D. Ellis, Boulder, CO (US); Edward B. Knudson, Littleton, CO (US); William L. Thomas, Bixby, OK (US); Bruce L. Davis, Lake Oswego, OR (US)

(73) Assignee: Rovi Guides, Inc., San Carlos, CA (US)

( * ) Notice: Subject to any disclaimer, the term of this patent is extended or adjusted under 35 U.S.C. 154(b) by 395 days.

(21) Appl. No.: 12/553,519

(22) Filed: Sep. 3, 2009

(65) Prior Publication Data

US 2010/0154001 A1 Jun. 17, 2010

Related U.S. Application Data

(63) Continuation of application No. 10/457,930, filed on Jun. 9, 2003, now abandoned, which is a continuation
(Continued)

(51) Int. Cl.
*H04N 7/173* (2011.01)
*G06F 3/00* (2006.01)
(Continued)

(52) U.S. Cl.
CPC ..... *H04N 5/44543* (2013.01); *H04N 21/4312* (2013.01); *H04N 21/4722* (2013.01); *H04N 21/47815* (2013.01); *H04N 21/482* (2013.01)

(58) Field of Classification Search
CPC ............. H04N 21/482; H04N 21/4825; H04N 21/4826; H04N 21/4332; H04N 21/234309;
(Continued)

(56) References Cited

U.S. PATENT DOCUMENTS 3,440,427 A 4/1969 Kammer
3,492,577 A 1/1970 Reiter et al.
(Continued)

FOREIGN PATENT DOCUMENTS

AU 56198-98 7/1998
AU 731010 7/1998
(Continued)

OTHER PUBLICATIONS

US 6,118,443, 09/2000, Allison et al. (withdrawn)
(Continued)

*Primary Examiner* — Pankaj Kumar
*Assistant Examiner* — Reuben M Brown
(74) *Attorney, Agent, or Firm* — Ropes & Gray LLP

(57) ABSTRACT

A system is provided in which an interactive television program guide is implemented on user television equipment such as a set-top box. The program guide provides an operator showcase in the form of one or more operator showcase television listings screens, each of which contains a set of television listings information. The sets of television listings information are generated by querying a database of television listings data in a database in the set-top box. Each database query is based on content criteria previously selected by the cable system operator or other service provider. The service provider is also able to define the format with which the television listings information is displayed in the television listings screens. A title and logos may also be selected by the service provider for each screen. The operator showcase television listings screens may therefore by customized and branded by the service provider. The user may access multiple operator showcase television listings screens using a centralized operator showcase menu.

29 Claims, 14 Drawing Sheets

Related U.S. Application Data of application No. 08/944,162, filed on Oct. 6, 1997, now Pat. No. 6,604,240.

(51) Int. Cl.
*H04N 5/445* (2011.01)
*H04N 21/431* (2011.01)
*H04N 21/4722* (2011.01)
*H04N 21/478* (2011.01)
*H04N 21/482* (2011.01)

(58) Field of Classification Search
CPC ... H04N 21/234363; H04N 21/234372; H04N 21/25825; H04N 21/26258; H04N 21/4312; H04N 21/4402; H04N 21/440218; H04N 21/440236; H04N 21/440263; H04N 21/481; H04N 21/4821; H04N 21/4828; H04N 21/4858
USPC .......................... 725/47, 39, 41–46; 715/838
See application file for complete search history.

(56) References Cited

U.S. PATENT DOCUMENTS

| | | |
|---|---|---|
| 3,493,674 A | 2/1970 | Houghton |
| 3,729,581 A | 4/1973 | Anderson |
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,058,830 A | 11/1977 | Guinet et al. |
| 4,070,693 A | 1/1978 | Shutterly |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffman |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga et al. |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |

(56) References Cited

U.S. PATENT DOCUMENTS

| | | |
|---|---|---|
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,003,384 A | 3/1991 | Durden et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |
| 5,038,211 A | 8/1991 | Hallenbeck |
| 5,045,947 A | 9/1991 | Beery |
| 5,047,867 A | 9/1991 | Strubbe et al. |
| 5,058,160 A | 10/1991 | Banker et al. |
| 5,062,060 A | 10/1991 | Kolnick |
| 5,068,734 A | 11/1991 | Beery |
| 5,072,412 A | 12/1991 | Henderson, Jr. et al. |
| 5,083,800 A | 1/1992 | Lockton |
| 5,091,785 A | 2/1992 | Canfield et al. |
| 5,093,921 A | 3/1992 | Bevins, Jr. |
| 5,099,319 A | 3/1992 | Esch et al. |
| 5,103,314 A | 4/1992 | Keenan |
| 5,105,184 A | 4/1992 | Pirani et al. |
| 5,109,414 A | 4/1992 | Harvey et al. |
| 5,119,188 A | 6/1992 | McCalley et al. |
| 5,121,476 A | 6/1992 | Yee |
| 5,123,046 A | 6/1992 | Levine |
| 5,126,851 A | 6/1992 | Yoshimura |
| 5,148,154 A | 9/1992 | Mackay et al. |
| 5,151,782 A | 9/1992 | Ferraro |
| 5,151,789 A | 9/1992 | Young |
| 5,155,591 A | 10/1992 | Wachob |
| 5,155,806 A | 10/1992 | Hoeber et al. |
| 5,157,768 A | 10/1992 | Hoeber et al. |
| 5,161,023 A | 11/1992 | Keenan |
| 5,162,905 A | 11/1992 | Itoh et al. |
| 5,170,388 A | 12/1992 | Endoh et al. |
| 5,172,111 A | 12/1992 | Olivo, Jr. |
| 5,177,604 A | 1/1993 | Martinez |
| 5,179,654 A | 1/1993 | Richards et al. |
| 5,195,092 A | 3/1993 | Wilson et al. |
| 5,200,823 A | 4/1993 | Yoneda et al. |
| 5,204,897 A | 4/1993 | Wyman |
| 5,206,722 A | 4/1993 | Kwan |
| 5,210,611 A | 5/1993 | Yee et al. |
| 5,212,553 A | 5/1993 | Maruoka |
| 5,214,622 A | 5/1993 | Nemoto et al. |
| 5,216,515 A | 6/1993 | Steele et al. |
| 5,220,420 A | 6/1993 | Hoarty et al. |
| 5,223,924 A | 6/1993 | Strubbe |
| 5,227,874 A | 7/1993 | Von Kohorn |
| 5,231,493 A | 7/1993 | Apitz |
| RE34,340 E | 8/1993 | Freeman |
| 5,233,423 A | 8/1993 | Jernigan et al. |
| 5,233,654 A | 8/1993 | Harvey et al. |
| 5,235,415 A | 8/1993 | Bonicel et al. |
| 5,236,199 A | 8/1993 | Thompson, Jr. |
| 5,237,411 A | 8/1993 | Fink et al. |
| 5,237,417 A | 8/1993 | Hayashi et al. |
| 5,237,418 A | 8/1993 | Kaneko |
| 5,239,540 A | 8/1993 | Rovira et al. |
| 5,245,420 A | 9/1993 | Harney et al. |
| 5,247,347 A | 9/1993 | Litteral et al. |
| 5,247,364 A | 9/1993 | Banker et al. |
| 5,247,580 A | 9/1993 | Kimura et al. |
| 5,253,066 A | 10/1993 | Vogel |
| 5,253,067 A | 10/1993 | Chaney et al. |
| 5,260,778 A | 11/1993 | Kauffman et al. |
| 5,260,999 A | 11/1993 | Wyman |
| 5,283,639 A | 2/1994 | Esch et al. |
| 5,283,819 A | 2/1994 | Glick et al. |
| 5,301,028 A | 4/1994 | Banker et al. |
| 5,307,173 A | 4/1994 | Yuen et al. |
| 5,311,423 A | 5/1994 | Clark |
| 5,313,282 A | 5/1994 | Hayashi |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee |
| 5,325,423 A | 6/1994 | Lewis |
| 5,335,277 A | 8/1994 | Harvey et al. |
| 5,343,239 A | 8/1994 | Lappington et al. |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,359,601 A | 10/1994 | Wasilewski et al. |
| 5,365,282 A | 11/1994 | Levine |
| 5,367,316 A | 11/1994 | Ikezaki |
| 5,367,330 A | 11/1994 | Haave et al. |
| 5,373,288 A | 12/1994 | Blahut |
| 5,374,951 A | 12/1994 | Welsh |
| 5,377,317 A | 12/1994 | Bates et al. |
| 5,377,319 A | 12/1994 | Kitahara et al. |
| 5,382,983 A | 1/1995 | Kwoh et al. |
| 5,384,910 A | 1/1995 | Torres |
| 5,387,945 A | 2/1995 | Takeuchi |
| 5,398,074 A | 3/1995 | Duffield et al. |
| 5,404,393 A | 4/1995 | Remillard |
| 5,404,505 A | 4/1995 | Levinson |
| 5,410,326 A | 4/1995 | Goldstein |
| 5,410,343 A | 4/1995 | Coddington et al. |
| 5,410,344 A | 4/1995 | Graves et al. |
| 5,410,367 A | 4/1995 | Zahavi et al. |
| 5,412,720 A | 5/1995 | Hoarty |
| 5,416,508 A | 5/1995 | Sakuma et al. |
| 5,424,770 A | 6/1995 | Schmelzer et al. |
| 5,425,101 A | 6/1995 | Woo et al. |
| 5,432,561 A | 7/1995 | Strubbe |
| 5,434,626 A | 7/1995 | Hayashi et al. |
| 5,436,676 A | 7/1995 | Pint et al. |
| 5,438,372 A | 8/1995 | Tsumori et al. |
| 5,440,678 A | 8/1995 | Eisen et al. |
| 5,446,919 A | 8/1995 | Wilkins |
| 5,452,012 A | 9/1995 | Saitoh |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,497 A | 12/1995 | Kovarik |
| 5,481,296 A | 1/1996 | Cragun et al. |
| 5,483,278 A | 1/1996 | Strubbe et al. |
| 5,485,197 A * | 1/1996 | Hoarty ............ 725/37 |
| 5,485,219 A | 1/1996 | Woo |
| 5,485,221 A | 1/1996 | Banker et al. |
| 5,488,409 A | 1/1996 | Yuen et al. |
| 5,495,295 A | 2/1996 | Long |
| 5,502,504 A | 3/1996 | Marshall et al. |

(56) References Cited

U.S. PATENT DOCUMENTS

| | | | |
|---|---|---|---|
| 5,515,098 | A | 5/1996 | Carles |
| 5,523,794 | A | 6/1996 | Mankovitz et al. |
| 5,523,796 | A | 6/1996 | Marshall et al. |
| 5,524,195 | A | 6/1996 | Clanton, III et al. |
| 5,526,034 | A | 6/1996 | Hoarty et al. |
| 5,527,257 | A | 6/1996 | Piramoon |
| 5,528,304 | A | 6/1996 | Cherrick et al. |
| 5,532,735 | A | 7/1996 | Blahut et al. |
| 5,532,754 | A | 7/1996 | Young et al. |
| 5,534,911 | A | 7/1996 | Levitan |
| 5,537,141 | A | 7/1996 | Harper et al. |
| 5,539,479 | A | 7/1996 | Bertram |
| 5,539,822 | A | 7/1996 | Lett |
| 5,541,662 | A | 7/1996 | Adams et al. |
| 5,541,738 | A | 7/1996 | Mankovitz |
| 5,550,576 | A | 8/1996 | Klosterman |
| 5,557,338 | A | 9/1996 | Maze et al. |
| 5,557,721 | A | 9/1996 | Fite et al. |
| 5,559,548 | A * | 9/1996 | Davis et al. ............... 725/40 |
| 5,559,549 | A | 9/1996 | Hendricks et al. |
| 5,559,550 | A | 9/1996 | Mankovitz |
| 5,559,942 | A | 9/1996 | Gough et al. |
| 5,561,471 | A | 10/1996 | Kim et al. |
| 5,570,295 | A | 10/1996 | Isenberg et al. |
| 5,572,442 | A | 11/1996 | Schulhof et al. |
| 5,574,962 | A | 11/1996 | Fardeau et al. |
| 5,579,055 | A | 11/1996 | Hamilton et al. |
| 5,581,479 | A | 12/1996 | McLaughlin et al. |
| 5,582,364 | A | 12/1996 | Trulin et al. |
| 5,583,560 | A | 12/1996 | Florin et al. |
| 5,583,563 | A | 12/1996 | Wanderscheid et al. |
| 5,585,838 | A | 12/1996 | Lawler et al. |
| 5,585,865 | A | 12/1996 | Amano et al. |
| 5,585,866 | A | 12/1996 | Miller et al. |
| 5,589,892 | A | 12/1996 | Knee et al. |
| 5,592,551 | A | 1/1997 | Lett et al. |
| 5,594,509 | A | 1/1997 | Florin et al. |
| 5,596,373 | A * | 1/1997 | White et al. ............... 348/569 |
| 5,600,364 | A | 2/1997 | Hendricks et al. |
| 5,600,366 | A | 2/1997 | Schulman |
| 5,600,573 | A | 2/1997 | Hendricks et al. |
| 5,602,582 | A | 2/1997 | Wanderscheid et al. |
| 5,602,596 | A | 2/1997 | Claussen et al. |
| 5,602,597 | A | 2/1997 | Bertram |
| 5,602,598 | A | 2/1997 | Shintani |
| 5,606,374 | A | 2/1997 | Bertram |
| 5,608,448 | A | 3/1997 | Smoral et al. |
| 5,610,653 | A | 3/1997 | Abecassis |
| 5,617,565 | A | 4/1997 | Augenbraun et al. |
| 5,619,247 | A | 4/1997 | Russo |
| 5,619,249 | A | 4/1997 | Billock et al. |
| 5,619,274 | A | 4/1997 | Roop et al. |
| 5,621,456 | A | 4/1997 | Florin et al. |
| 5,623,613 | A | 4/1997 | Rowe et al. |
| 5,627,940 | A | 5/1997 | Rohra et al. |
| 5,629,733 | A | 5/1997 | Youman et al. |
| 5,630,119 | A | 5/1997 | Aristedes et al. |
| 5,631,995 | A | 5/1997 | Weissensteiner et al. |
| 5,633,683 | A | 5/1997 | Rosengren et al. |
| 5,635,978 | A | 6/1997 | Alten et al. |
| 5,635,979 | A | 6/1997 | Kostreski et al. |
| 5,635,989 | A | 6/1997 | Rothmuller |
| 5,636,346 | A | 6/1997 | Saxe |
| 5,640,501 | A | 6/1997 | Turpin |
| 5,640,577 | A | 6/1997 | Scharmer |
| 5,642,153 | A | 6/1997 | Chaney et al. |
| 5,648,813 | A | 7/1997 | Tanigawa et al. |
| 5,648,824 | A | 7/1997 | Dunn et al. |
| 5,650,826 | A | 7/1997 | Eitz |
| 5,650,831 | A | 7/1997 | Farwell |
| 5,652,613 | A | 7/1997 | Lazarus et al. |
| 5,652,615 | A | 7/1997 | Bryant et al. |
| 5,654,748 | A | 8/1997 | Matthews, III |
| 5,654,886 | A | 8/1997 | Zereski, Jr. et al. |
| 5,657,072 | A | 8/1997 | Aristides et al. |
| 5,657,091 | A | 8/1997 | Bertram |
| 5,659,350 | A * | 8/1997 | Hendricks et al. ........... 725/116 |
| 5,659,366 | A | 8/1997 | Kerman |
| 5,661,516 | A | 8/1997 | Caries |
| 5,661,517 | A | 8/1997 | Budow et al. |
| 5,663,757 | A | 9/1997 | Morales |
| 5,664,111 | A | 9/1997 | Nahan et al. |
| 5,666,293 | A | 9/1997 | Metz |
| 5,666,498 | A | 9/1997 | Amro |
| 5,666,645 | A | 9/1997 | Thomas et al. |
| 5,671,276 | A | 9/1997 | Eyer et al. |
| 5,671,411 | A * | 9/1997 | Watts et al. ............... 725/43 |
| 5,675,390 | A | 10/1997 | Schindler et al. |
| 5,675,752 | A | 10/1997 | Scott et al. |
| 5,677,708 | A | 10/1997 | Matthews, III et al. |
| 5,682,195 | A | 10/1997 | Hendricks et al. |
| 5,682,206 | A | 10/1997 | Wehmeyer et al. |
| 5,686,954 | A | 11/1997 | Yoshinobu et al. |
| 5,687,331 | A | 11/1997 | Volk et al. |
| 5,689,648 | A | 11/1997 | Diaz et al. |
| 5,689,666 | A | 11/1997 | Berquist et al. |
| 5,692,214 | A | 11/1997 | Levine |
| 5,694,163 | A | 12/1997 | Harrison |
| 5,694,176 | A * | 12/1997 | Bruette et al. ............... 725/43 |
| 5,694,381 | A | 12/1997 | Sako |
| 5,696,905 | A | 12/1997 | Reimer et al. |
| 5,699,107 | A | 12/1997 | Lawler et al. |
| 5,699,125 | A | 12/1997 | Rzeszewski et al. |
| 5,708,478 | A | 1/1998 | Tognazzini |
| 5,710,601 | A | 1/1998 | Marshall et al. |
| 5,710,815 | A | 1/1998 | Ming et al. |
| 5,710,884 | A | 1/1998 | Dedrick |
| 5,715,314 | A | 2/1998 | Payne et al. |
| 5,715,399 | A | 2/1998 | Bezos |
| 5,717,452 | A | 2/1998 | Janin et al. |
| 5,721,829 | A | 2/1998 | Dunn et al. |
| 5,724,521 | A | 3/1998 | Dedrick |
| 5,724,525 | A | 3/1998 | Beyers et al. |
| 5,727,060 | A | 3/1998 | Young |
| 5,727,163 | A | 3/1998 | Bezos |
| 5,731,844 | A * | 3/1998 | Rauch et al. ............... 725/40 |
| 5,734,444 | A | 3/1998 | Yoshinobu |
| 5,734,853 | A | 3/1998 | Hendricks et al. |
| 5,734,893 | A | 3/1998 | Li |
| 5,737,028 | A | 4/1998 | Bertram et al. |
| 5,737,030 | A | 4/1998 | Hong et al. |
| 5,740,549 | A | 4/1998 | Reilly et al. |
| 5,749,043 | A | 5/1998 | Worthy |
| 5,751,282 | A | 5/1998 | Girard et al. |
| 5,752,159 | A | 5/1998 | Faust et al. |
| 5,754,258 | A | 5/1998 | Hanaya et al. |
| 5,754,771 | A | 5/1998 | Epperson et al. |
| 5,754,939 | A | 5/1998 | Herz et al. |
| 5,757,417 | A | 5/1998 | Aras et al. |
| 5,758,257 | A | 5/1998 | Herz et al. |
| 5,758,259 | A | 5/1998 | Lawler |
| 5,760,821 | A | 6/1998 | Ellis et al. |
| 5,761,372 | A | 6/1998 | Yoshinobu et al. |
| 5,761,601 | A | 6/1998 | Nemirofsky et al. |
| 5,768,528 | A | 6/1998 | Stumm |
| 5,774,170 | A | 6/1998 | Hite et al. |
| 5,774,534 | A | 6/1998 | Mayer |
| 5,774,887 | A | 6/1998 | Wolff et al. |
| 5,778,182 | A | 7/1998 | Cathey et al. |
| 5,781,226 | A | 7/1998 | Sheehan |
| 5,781,245 | A | 7/1998 | Weij et al. |
| 5,781,246 | A | 7/1998 | Alten et al. |
| 5,790,202 | A | 8/1998 | Kummer et al. |
| 5,790,426 | A | 8/1998 | Robinson |
| 5,790,835 | A | 8/1998 | Case et al. |
| 5,790,935 | A | 8/1998 | Payton |
| 5,793,409 | A | 8/1998 | Tetsumura |
| 5,793,438 | A | 8/1998 | Bedard |
| 5,793,964 | A | 8/1998 | Rogers et al. |
| 5,798,785 | A | 8/1998 | Hendricks et al. |
| 5,801,747 | A | 9/1998 | Bedard |
| 5,801,785 | A | 9/1998 | Crump et al. |
| 5,801,787 | A | 9/1998 | Schein et al. |
| 5,802,284 | A | 9/1998 | Karlton et al. |

(56) References Cited

U.S. PATENT DOCUMENTS

| | | |
|---|---|---|
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,123 A | 9/1998 | Rowe et al. |
| 5,812,205 A | 9/1998 | Milnes et al. |
| 5,815,145 A | 9/1998 | Matthews, III |
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,541 A | 10/1998 | Matsuura et al. |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,828,402 A | 10/1998 | Collings |
| 5,828,419 A | 10/1998 | Bruette et al. |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,838,314 A | 11/1998 | Neel et al. |
| 5,842,010 A | 11/1998 | Jain et al. |
| 5,842,199 A | 11/1998 | Miller et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A * | 12/1998 | LaJoie et al. .................. 725/45 |
| 5,862,292 A | 1/1999 | Kubota et al. |
| 5,867,226 A | 2/1999 | Wehmeyer et al. |
| 5,867,227 A | 2/1999 | Yamaguchi |
| 5,870,543 A | 2/1999 | Ronning |
| 5,872,588 A | 2/1999 | Aras et al. |
| 5,874,985 A | 2/1999 | Matthews, III |
| 5,880,768 A | 3/1999 | Lemmons et al. |
| 5,883,677 A | 3/1999 | Hofmann |
| 5,886,691 A | 3/1999 | Furuya et al. |
| 5,886,731 A | 3/1999 | Ebisawa |
| 5,887,243 A | 3/1999 | Harvey et al. |
| 5,892,498 A | 4/1999 | Marshall et al. |
| 5,892,535 A | 4/1999 | Allen et al. |
| 5,895,474 A | 4/1999 | Maarek et al. |
| 5,900,905 A | 5/1999 | Shoff et al. |
| 5,903,314 A | 5/1999 | Niijima et al. |
| 5,903,816 A | 5/1999 | Broadwin et al. |
| 5,905,497 A | 5/1999 | Vaughan et al. |
| 5,907,323 A * | 5/1999 | Lawler et al. .................. 725/41 |
| 5,907,366 A | 5/1999 | Farmer et al. |
| 5,914,746 A | 6/1999 | Matthews, III et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,929,849 A | 7/1999 | Kikinis |
| 5,929,850 A | 7/1999 | Broadwin et al. |
| 5,929,932 A * | 7/1999 | Otsuki et al. .................. 725/47 |
| 5,936,679 A | 8/1999 | Kasahara et al. |
| 5,940,073 A | 8/1999 | Klosterman et al. |
| 5,940,572 A | 8/1999 | Balaban et al. |
| 5,945,988 A | 8/1999 | Williams et al. |
| 5,951,642 A | 9/1999 | Onoe et al. |
| 5,953,005 A | 9/1999 | Liu |
| 5,959,688 A | 9/1999 | Schein et al. |
| 5,960,411 A | 9/1999 | Hartman et al. |
| 5,974,222 A | 10/1999 | Yuen et al. |
| 5,977,964 A | 11/1999 | Williams et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,999,912 A | 12/1999 | Wodarz et al. |
| 6,002,393 A | 12/1999 | Hite et al. |
| 6,002,394 A | 12/1999 | Schein et al. |
| 6,005,562 A | 12/1999 | Shiga et al. |
| 6,005,565 A | 12/1999 | Legall et al. |
| 6,005,566 A | 12/1999 | Jones et al. |
| 6,005,597 A | 12/1999 | Barrett et al. |
| 6,005,601 A | 12/1999 | Ohkura et al. |
| 6,006,257 A | 12/1999 | Slezak |
| 6,008,802 A | 12/1999 | Iki |
| 6,008,803 A | 12/1999 | Rowe et al. |
| 6,011,546 A | 1/2000 | Bertram |
| 6,014,137 A | 1/2000 | Burns |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,929 A | 2/2000 | Marshall et al. |
| 6,025,837 A | 2/2000 | Matthews, III et al. |
| 6,025,886 A | 2/2000 | Koda |
| 6,028,599 A | 2/2000 | Yuen et al. |
| 6,028,600 A | 2/2000 | Rosin et al. |
| 6,029,045 A | 2/2000 | Picco et al. |
| 6,029,176 A | 2/2000 | Cannon |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,052,145 A | 4/2000 | Macrae et al. |
| 6,061,060 A | 5/2000 | Berry et al. |
| 6,061,082 A | 5/2000 | Park |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,072,460 A | 6/2000 | Marshall et al. |
| 6,075,551 A | 6/2000 | Berezowski et al. |
| 6,075,575 A | 6/2000 | Schein et al. |
| 6,078,348 A | 6/2000 | Klosterman et al. |
| 6,081,830 A | 6/2000 | Schindler |
| 6,091,883 A | 7/2000 | Artigalas et al. |
| 6,098,065 A | 8/2000 | Skillen et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginuma |
| 6,133,909 A | 10/2000 | Schein et al. |
| 6,141,003 A | 10/2000 | Chor et al. |
| 6,147,714 A | 11/2000 | Terasawa et al. |
| 6,147,715 A * | 11/2000 | Yuen ............... G11B 23/042 348/564 |
| 6,151,059 A | 11/2000 | Schein et al. |
| 6,154,203 A | 11/2000 | Yuen et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,163,316 A | 12/2000 | Killian |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,186,287 B1 | 2/2001 | Heidenreich et al. |
| 6,186,443 B1 | 2/2001 | Shaffer |
| 6,191,780 B1 | 2/2001 | Martin et al. |
| 6,201,536 B1 | 3/2001 | Hendricks et al. |
| 6,202,212 B1 | 3/2001 | Sturgeon et al. |
| 6,209,129 B1 | 3/2001 | Carr et al. |
| 6,209,130 B1 | 3/2001 | Rector, Jr. et al. |
| 6,239,794 B1 | 5/2001 | Yuen et al. |
| 6,240,555 B1 | 5/2001 | Shoff et al. |

(56) References Cited

U.S. PATENT DOCUMENTS

| | | | |
|---|---|---|---|
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,279,157 B1 | 8/2001 | Takasu |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,311,877 B1 | 11/2001 | Yang et al. |
| 6,312,336 B1 | 11/2001 | Handelman et al. |
| 6,320,588 B1 | 11/2001 | Palmer et al. |
| 6,323,911 B1 | 11/2001 | Schein et al. |
| 6,323,931 B1 | 11/2001 | Fujita et al. |
| 6,331,877 B1 | 12/2001 | Bennington et al. |
| 6,341,195 B1 | 1/2002 | Mankovitz et al. |
| 6,342,926 B1 | 1/2002 | Hanafee et al. |
| 6,357,042 B2 | 3/2002 | Srinivasan et al. |
| 6,363,525 B1 | 3/2002 | Dougherty et al. |
| 6,366,890 B1 | 4/2002 | Usrey |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 * | 6/2002 | Oosterhout ........ H04N 5/44543 348/564 |
| 6,408,437 B1 | 6/2002 | Hendricks et al. |
| 6,411,308 B1 | 6/2002 | Blonstein et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,446,261 B1 | 9/2002 | Rosser |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,493,876 B1 | 12/2002 | DeFreese et al. |
| 6,498,895 B2 | 12/2002 | Young et al. |
| 6,515,680 B1 | 2/2003 | Hendricks et al. |
| 6,516,323 B1 | 2/2003 | Kamba |
| 6,530,082 B1 | 3/2003 | Del Sesto et al. |
| 6,539,548 B1 | 3/2003 | Hendricks et al. |
| 6,545,722 B1 | 4/2003 | Schultheiss et al. |
| 6,546,556 B1 | 4/2003 | Kataoka et al. |
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,604,240 B2 | 8/2003 | Ellis et al. |
| 6,606,128 B2 | 8/2003 | Hanafee et al. |
| 6,622,306 B1 | 9/2003 | Kamada |
| 6,631,523 B1 | 10/2003 | Matthews et al. |
| 6,637,029 B1 | 10/2003 | Maissel et al. |
| 6,651,251 B1 | 11/2003 | Shoff et al. |
| 6,660,503 B2 | 12/2003 | Kierulff |
| 6,661,468 B2 | 12/2003 | Alten et al. |
| 6,665,869 B1 | 12/2003 | Ellis et al. |
| 6,687,906 B1 | 2/2004 | Yuen et al. |
| 6,698,020 B1 | 2/2004 | Zigmond et al. |
| 6,704,931 B1 | 3/2004 | Schaffer et al. |
| 6,732,369 B1 | 5/2004 | Schein |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,792,618 B1 | 9/2004 | Bendinelli et al. |
| 6,799,327 B1 | 9/2004 | Reynolds et al. |
| 6,828,993 B1 | 12/2004 | Hendricks et al. |
| 6,857,131 B1 | 2/2005 | Yagawa et al. |
| 6,868,551 B1 | 3/2005 | Lawler et al. |
| 6,938,208 B2 | 8/2005 | Reichardt |
| 6,973,669 B2 | 12/2005 | Daniels |
| 6,983,478 B1 | 1/2006 | Grauch et al. |
| 7,003,792 B1 | 2/2006 | Yuen |
| 7,028,326 B1 | 4/2006 | Westlake et al. |
| 7,039,935 B2 | 5/2006 | Knudson et al. |
| 7,047,550 B1 | 5/2006 | Yasukawa et al. |
| 7,069,576 B1 | 6/2006 | Knudson et al. |
| 7,117,518 B1 | 10/2006 | Takahashi et al. |
| 7,185,355 B1 | 2/2007 | Ellis et al. |
| 7,187,847 B2 | 3/2007 | Young et al. |
| 7,266,833 B2 | 9/2007 | Ward, III et al. |
| 7,287,267 B2 | 10/2007 | Knudson et al. |
| 7,328,450 B2 | 2/2008 | Macrae et al. |
| 7,480,929 B2 | 1/2009 | Klosterman et al. |
| 7,487,529 B1 | 2/2009 | Orlick |
| 7,493,641 B2 | 2/2009 | Klosterman et al. |
| 7,503,055 B2 | 3/2009 | Reynolds et al. |
| 7,634,786 B2 | 12/2009 | Knee et al. |
| 7,665,109 B2 | 2/2010 | Matthews, III et al. |
| 7,779,437 B2 | 8/2010 | Barton |
| 8,613,020 B2 | 12/2013 | Knudson et al. |
| 2001/0001160 A1 | 5/2001 | Shoff et al. |
| 2001/0029610 A1 | 10/2001 | Corvin et al. |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0042913 A1 | 4/2002 | Ellis et al. |
| 2002/0042918 A1 | 4/2002 | Townsend et al. |
| 2002/0049972 A1 * | 4/2002 | Kimoto ............. H04N 5/44543 725/39 |
| 2002/0049973 A1 | 4/2002 | Alten et al. |
| 2002/0059602 A1 | 5/2002 | Macrae et al. |
| 2002/0073424 A1 | 6/2002 | Ward et al. |
| 2002/0083439 A1 | 6/2002 | Eldering |
| 2002/0092017 A1 | 7/2002 | Klosterman et al. |
| 2002/0120933 A1 | 8/2002 | Knudson et al. |
| 2002/0124249 A1 | 9/2002 | Shintani et al. |
| 2002/0129366 A1 * | 9/2002 | Schein et al. .................... 725/43 |
| 2003/0005432 A1 | 1/2003 | Ellis et al. |
| 2003/0009758 A1 * | 1/2003 | Townsend .......... H04N 7/17318 725/39 |
| 2003/0110499 A1 | 6/2003 | Knudson et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0196203 A1 | 10/2003 | Ellis et al. |
| 2003/0200544 A1 | 10/2003 | Ellis et al. |
| 2003/0204847 A1 | 10/2003 | Ellis et al. |
| 2003/0208756 A1 | 11/2003 | Macrae et al. |
| 2003/0208758 A1 | 11/2003 | Schein et al. |
| 2004/0003407 A1 | 1/2004 | Hanafee et al. |
| 2004/0049787 A1 | 3/2004 | Maissel et al. |
| 2004/0139465 A1 * | 7/2004 | Matthews et al. ............... 725/51 |
| 2004/0168189 A1 | 8/2004 | Reynolds et al. |
| 2004/0194131 A1 | 9/2004 | Ellis et al. |
| 2004/0194138 A1 | 9/2004 | Boylan, III et al. |
| 2005/0155056 A1 | 7/2005 | Knee et al. |
| 2005/0157217 A1 | 7/2005 | Hendricks |
| 2005/0198668 A1 | 9/2005 | Yuen et al. |
| 2005/0204382 A1 | 9/2005 | Ellis |
| 2005/0216936 A1 | 9/2005 | Knudson |
| 2005/0244138 A1 | 11/2005 | O'Connor et al. |
| 2005/0278741 A1 | 12/2005 | Robarts et al. |
| 2005/0283796 A1 | 12/2005 | Flickinger |
| 2008/0178222 A1 * | 7/2008 | Bennington et al. ............. 725/43 |

(56) References Cited

U.S. PATENT DOCUMENTS

| | | | |
|---|---|---|---|
| 2010/0275230 A1* | 10/2010 | Yuen et al. | 725/43 |
| 2012/0272270 A1* | 10/2012 | Boyer et al. | 725/39 |

FOREIGN PATENT DOCUMENTS

| | | |
|---|---|---|
| AU | 733993 | 2/1999 |
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2164608 | 12/1994 |
| CA | 2285645 A1 | 7/1998 |
| CA | 2312326 | 6/1999 |
| DE | 2918846 | 11/1980 |
| DE | 3246225 | 6/1984 |
| DE | 3337204 | 4/1985 |
| DE | 3621263 | 7/1988 |
| DE | 3909334 | 9/1990 |
| DE | 44 40 419 | 5/1996 |
| DE | 19531121 A1 | 2/1997 |
| DE | 3909334 | 2/1998 |
| DE | 19740079 A1 | 3/1999 |
| DE | 19931046 | 1/2001 |
| EP | 0 239 884 | 10/1987 |
| EP | 0 396 062 | 11/1990 |
| EP | 0396062 | 11/1990 |
| EP | 0 401 930 A2 | 12/1990 |
| EP | 0 408 892 | 1/1991 |
| EP | 0 420 123 | 4/1991 |
| EP | 0 424 648 A3 | 5/1991 |
| EP | 0 444 496 A1 | 9/1991 |
| EP | 0 550 911 | 12/1992 |
| EP | 0 532 322 | 3/1993 |
| EP | 0 560 593 A2 | 9/1993 |
| EP | 0 572 090 B | 12/1993 |
| EP | 0 682 452 A2 | 11/1995 |
| EP | 0 725 539 | 8/1996 |
| EP | 0 752 767 A2 | 1/1997 |
| EP | 0 753 964 A1 | 1/1997 |
| EP | 0 762 751 | 3/1997 |
| EP | 0 772 360 A2 | 5/1997 |
| EP | 0 775 417 B1 | 5/1997 |
| EP | 0 784 405 | 7/1997 |
| EP | 0 805 594 B1 | 11/1997 |
| EP | 0 822 718 A1 | 2/1998 |
| EP | 0 880 856 B1 | 2/1998 |
| EP | 0 784 405 A3 | 3/1998 |
| EP | 0 827 340 A2 | 3/1998 |
| EP | 0 834 798 | 4/1998 |
| EP | 0 848 554 A2 | 6/1998 |
| EP | 0 849 948 A2 | 6/1998 |
| EP | 0 851 681 A1 | 7/1998 |
| EP | 0 852 442 A1 | 7/1998 |
| EP | 0 854 645 A2 | 7/1998 |
| EP | 0 905 985 A2 | 3/1999 |
| EP | 0 924 927 A2 | 6/1999 |
| EP | 0 935 393 A2 | 8/1999 |
| EP | 0 944 253 A1 | 9/1999 |
| EP | 0 963 119 A1 | 12/1999 |
| EP | 0 988 876 | 3/2000 |
| EP | 1 095 504 B1 | 5/2001 |
| EP | 0 822 718 B1 | 6/2002 |
| FR | 2662895 | 12/1991 |
| GB | 1 554 411 | 10/1979 |
| GB | 2034995 | 6/1980 |
| GB | 2126002 | 3/1984 |
| GB | 2185670 | 7/1987 |
| GB | 2256546 | 12/1992 |
| GB | 2 305 049 A | 3/1997 |
| GB | 2309134 A | 7/1997 |
| JP | 58-137334 | 8/1983 |
| JP | 58137334 | 8/1983 |
| JP | 58-196738 | 11/1983 |
| JP | 58196738 | 11/1983 |
| JP | 58 210776 A | 12/1983 |
| JP | 59-141878 | 8/1984 |
| JP | 60-061935 | 4/1985 |
| JP | 61-050470 | 3/1986 |
| JP | 61-074476 | 4/1986 |
| JP | 62-060370 | 3/1987 |
| JP | 62-060384 | 3/1987 |
| JP | 63 234679 A | 9/1988 |
| JP | 63234679 | 9/1988 |
| JP | 01-307944 | 12/1989 |
| JP | 02-048879 | 2/1990 |
| JP | 02048879 | 2/1990 |
| JP | 03063990 | 3/1991 |
| JP | 04-227380 | 8/1992 |
| JP | 05-183826 | 7/1993 |
| JP | 05-284437 | 10/1993 |
| JP | 06-021907 | 1/1994 |
| JP | 07-020254 | 1/1995 |
| JP | 0723356 | 1/1995 |
| JP | 07-050259 | 2/1995 |
| JP | 07-076592 | 3/1995 |
| JP | 07-123326 | 5/1995 |
| JP | 07-147657 | 6/1995 |
| JP | 07-288759 | 10/1995 |
| JP | 07-321748 | 12/1995 |
| JP | 08-32538 | 2/1996 |
| JP | 0832528 | 2/1996 |
| JP | 08-125497 | 5/1996 |
| JP | 08506941 | 7/1996 |
| JP | 08-251122 | 9/1996 |
| JP | 08-275077 | 10/1996 |
| JP | 08-331546 A | 12/1996 |
| JP | 08331546 | 12/1996 |
| JP | 09-037151 | 2/1997 |
| JP | 09-037172 | 2/1997 |
| JP | 09-102827 | 4/1997 |
| JP | 9-261609 A | 10/1997 |
| JP | 9261609 | 10/1997 |
| JP | 10-501936 | 2/1998 |
| JP | 10042218 | 2/1998 |
| JP | 10-512420 | 11/1998 |
| JP | 2838892 | 12/1998 |
| JP | 2001-213595 | 8/2001 |
| JP | 2001-513595 | 9/2001 |
| JP | 2002-279969 | 9/2002 |
| WO | WO 86-01962 | 3/1986 |
| WO | WO 87-03766 | 6/1987 |
| WO | WO 88-04507 | 6/1988 |
| WO | WO 89-02682 | 3/1989 |
| WO | WO8902682 | 3/1989 |
| WO | WO 89-03085 | 4/1989 |
| WO | WO8903085 | 4/1989 |
| WO | WO 89-12370 | 12/1989 |
| WO | WO8912370 | 12/1989 |
| WO | WO 90-01243 | 2/1990 |
| WO | WO9001243 | 2/1990 |
| WO | WO 90-15507 | 12/1990 |
| WO | WO91-00670 | 1/1991 |
| WO | WO 91-18476 | 11/1991 |
| WO | WO 92-04801 | 3/1992 |
| WO | WO 93-04473 | 3/1993 |
| WO | WO 93-05452 | 3/1993 |
| WO | WO 93-11638 | 6/1993 |
| WO | WO 93-11639 | 6/1993 |
| WO | WO 93-11640 | 6/1993 |
| WO | WO 93-23957 | 11/1993 |
| WO | WO 94-13107 | 6/1994 |
| WO | WO 94-14281 | 6/1994 |
| WO | WO 94-14282 | 6/1994 |
| WO | WO 94-14283 | 6/1994 |
| WO | WO 94/14284 | 6/1994 |
| WO | WO 94-14284 | 6/1994 |
| WO | WO9414281 | 6/1994 |
| WO | WO 94-21085 | 9/1994 |
| WO | WO 94-23383 | 10/1994 |
| WO | WO 94-29811 | 12/1994 |
| WO | WO 95-01056 | 1/1995 |
| WO | WO 95-01058 | 1/1995 |

(56) References Cited

FOREIGN PATENT DOCUMENTS

| | | |
|---|---|---|
| WO | WO 95-01059 | 1/1995 |
| WO | WO 95-06389 | 3/1995 |
| WO | WO 95-07003 | 3/1995 |
| WO | WO 95-10910 | 4/1995 |
| WO | WO 95-15649 | 6/1995 |
| WO | WO 95-15657 | 6/1995 |
| WO | WO 95-15658 | 6/1995 |
| WO | WO 95-19092 A1 | 7/1995 |
| WO | WO 95-28055 | 10/1995 |
| WO | WO 95-30961 | 11/1995 |
| WO | WO 95-31069 | 11/1995 |
| WO | WO 95-32583 | 11/1995 |
| WO | WO 95-32585 | 11/1995 |
| WO | WO9530302 | 11/1995 |
| WO | WO9531069 | 11/1995 |
| WO | WO9532587 | 11/1995 |
| WO | WO 96-07270 A | 3/1996 |
| WO | WO 96-08109 | 3/1996 |
| WO | WO 96-08113 | 3/1996 |
| WO | WO 96-09721 | 3/1996 |
| WO | WO 96-13932 A1 | 5/1996 |
| WO | WO 96-13935 | 5/1996 |
| WO | WO 96-17467 | 6/1996 |
| WO | WO 96-17473 | 6/1996 |
| WO | WO 96-21990 | 7/1996 |
| WO | WO 96-26605 | 8/1996 |
| WO | WO 96-31980 | 10/1996 |
| WO | WO 96-34467 | 10/1996 |
| WO | WO 96-34486 | 10/1996 |
| WO | WO 96-34491 | 10/1996 |
| WO | WO 96-38799 | 12/1996 |
| WO | WO 96-41471 | 12/1996 |
| WO | WO 96-41477 | 12/1996 |
| WO | WO 96-41478 | 12/1996 |
| WO | WO 97-04595 | 2/1997 |
| WO | WO 97-07656 | 3/1997 |
| WO | WO 97/12486 | 4/1997 |
| WO | WO 97-13368 | 4/1997 |
| WO | WO 97-17774 | 5/1997 |
| WO | WO 97-18675 | 5/1997 |
| WO | WO 97-26612 | 7/1997 |
| WO | WO 97-31480 | 8/1997 |
| WO | WO 97-41673 | 11/1997 |
| WO | WO 97-42763 | 11/1997 |
| WO | WO 97-48230 | 12/1997 |
| WO | WO 97-49237 | 12/1997 |
| WO | WO 97-49241 | 12/1997 |
| WO | WO 97-49242 | 12/1997 |
| WO | WO 98-06219 | 2/1998 |
| WO | WO 98-10589 | 3/1998 |
| WO | WO 98-16062 | 4/1998 |
| WO | WO 98-17064 | 4/1998 |
| WO | WO 98-20675 | 5/1998 |
| WO | WO 98-26569 | 6/1998 |
| WO | WO 98-26584 | 6/1998 |
| WO | WO 98-27723 | 6/1998 |
| WO | WO 98-28906 | 7/1998 |
| WO | WO 98-31148 | 7/1998 |
| WO | WO 98-37695 | 8/1998 |
| WO | WO 98-41020 | 9/1998 |
| WO | WO 98-43183 | 10/1998 |
| WO | WO 98-47279 | 10/1998 |
| WO | WO 98-56172 | 12/1998 |
| WO | WO 98-56712 | 12/1998 |
| WO | WO 99-04561 | 1/1999 |
| WO | WO 99-07142 | 2/1999 |
| WO | WO 99-18722 | 4/1999 |
| WO | WO 99-29109 | 6/1999 |
| WO | WO 99-30491 | 6/1999 |
| WO | WO 99-31480 | 6/1999 |
| WO | WO 99-45700 | 9/1999 |
| WO | WO 99-45702 | 9/1999 |
| WO | WO 99-52285 | 10/1999 |
| WO | WO 99-56466 | 11/1999 |
| WO | WO 99-56473 | 11/1999 |
| WO | WO 99-60783 | 11/1999 |
| WO | WO 99-60789 | 11/1999 |
| WO | WO 00-04706 | 1/2000 |
| WO | WO 00-05889 | 2/2000 |
| WO | WO 00-11865 | 3/2000 |
| WO | WO 00-16548 | 3/2000 |
| WO | WO 00-27122 | 5/2000 |
| WO | WO 00-28734 | 5/2000 |
| WO | WO 00-33160 | 6/2000 |
| WO | WO 00-33224 | 6/2000 |
| WO | WO 00-33560 | 6/2000 |
| WO | WO 00-49801 | 8/2000 |
| WO | WO 00-79798 | 12/2000 |
| WO | WO 01-06784 | 1/2001 |
| WO | WO 01-15438 | 3/2001 |
| WO | WO 01-35662 | 5/2001 |
| WO | WO 01-89213 | 11/2001 |
| WO | WO 02-31731 | 4/2002 |

OTHER PUBLICATIONS

Allison et al., U.S. Pat. No. 6,118,443 (withdrawn) (Sep. 2000).
2720R Satellite Receiver User's Guide, General Instrument, 1991, pp. 58-61.
"Addressable Converters: A New Development at CableData," Via Cable, vol. 1, No. 12, Dec. 1981.
Advertisement for "TV Decisions," Cable Vision, Aug. 4, 1986.
Alexander, Michael "Visualizing cleared-off desktops," Computerworld, May 6, 1991, p. 20.
Antonoff, M., "Stay Tuned for Smart TV," Popular Science, Nov. 1990, pp. 62-65.
Baer, R.H, "Innovative Add-On TV Products," IEEE Transactions on Consumer Electronics, vol. CE-25, Nov. 1979, pp. 765-771.
"Bell Atlantic Buys Cable TV Company for $22bn," Financial Times (London), Oct. 14, 1993 p. 65.
Bensch, U., "VPV Videotext Programs Videorecorder," IEEE Paper, Jun. 1988, pp. 788-792.
Bestler, Caitlin "Flexible Data Structures and Interface Rituals for Rapid Development of OSD Applications," Proceedings from the Eleven Technical Sessions, 42nd Annual Convention and Exposition and Exploration of the NCTA, San Francisco, CA Jun. 6-9, 1993, pp. 223-236. Jun. 6, 1993.
Brochure, "A New Approach to Addressability," CableData, undated.
Brochure, "Westar and Videotoken Network Present the CableComputer," Revised Aug. 15, 1985 (Plaintiffs 334).
Brochure, Time Inc., "Now, Through the Advances of the Computer Age, You Can Get the Information You Want, When You Want It. Instantly and Conveniently, On Your Home TV Screen,"Time Teletext, Time Video Information Services, Inc., undated (V 79167-79175).
Brochure, VTN "Videotoken Network, New Dimension Television," Dec. 1985 (Plaintiffs Exhibit 313).
Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
Cable Computer User's Guide, Rev. 1, Dec. 1985 (Plaintiffs Exhibit 289).
"Cable Television Equipment," Jerrold Communications Publication, dated 1992 and 1993, pp. 8-2.1 to 8-6 and 8-14.1 to 8-14.3.
Came, E.B., "The Wired Household," IEEE Spectrum, vol. 16 No. 10, Oct. 1979, pp. 61-66.
Chan, Patrick P., "Learning Considerations in User Interface Design: The Room Model," Publication of the Software Portability Laboratory, University of Waterloo, Ontario, Canada, Jul. 1984.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
"Computer Network: Current Status and Outlook on Leading Science and Technology," Bureau of Science & Technology (Japan), vol. 1, Dec. 1986.

(56) References Cited

OTHER PUBLICATIONS

Cox, J. et al, "Extended Services in a Digital Compression System," Proceedings from Eleven Technical Sessions: 42nd Annual Convention and Exposition of the National Cable Television Association, Jun. 1993, pp. 185-191.
Creation/Modification of the Audio Signal Processor Setup for a PC Audio Editor, IBM Technical Disclosure Bulletin, vol. 30, No. 10, Mar. 1988, pp. 367-376.
"D2B-Home Bus Fur Audio and Video," Selektor, Apr. 1990, pp. 10, 12.
Damouny, N.G., "Teletext Decoders—Keeping Up With the Latest Advances," IEEE Transactions on Consumer Electronics, vol. CE-30, No. 3, Aug. 1984, pp. 429-435.
"Dial M for Movie", Funkschau 11/94 Perspektiven, Video on Demand, pp. 78-79. (English language translation attached).
"Digital Video Broadcasting (DVB); DVB specification for data broadcasting," European Telecommunication Standards Institute, Draft EN 301 192 V1.2.1 (Jan. 1999).
DiRosa, S. "BIGSURF Netguide", Jul. 1995, vol. 3.1 (Sections 18,21, and 28—renumbered as pp. 1-27).
"Duck Tales," (1987)[TV Series 1987-1990], Internet Movie Database (IMDB) [Retrieved on Apr. 7, 2007].
Edwardson, S.M., & Gee, A., "CEEFAX: A Proposed New Broadcasting Service," Journal of the SMPTE, Jan. 1974, vol. 83 No. 1, pp. 14-19.
Eitz, Gerhard, "Zukunftige Informations-und Datenangebote beim dig italen Femsehen—EPG Und 'Lesezeichen'," RTM Rundfunktechnische Mitteilungen, Jun. 1997, vol. 41, pp. 67-72.
"Enhanced Content Specification," "ATVEF," from the internet at http://www.atvetcomilibraryispec.html, printed Aug. 22, 2001, the document bears a Copyright date of 1998, 1999, 2000.
European Telecommunication Standard, Electronic Programme Guide (EPG); Protocol for a TV Guide using electronic data transmission, by European Telecommunication Standards Institute, Valbonne, France, publication No. ETS 300 707 date of May 1997.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994.
"Facsimile Transmission," NHK Research Monthly Report, Dec. 1987(Unknown author).
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hiroshi Ishii et al, "Clearface: Translucent Multiuser Interface for TeamWorkStation," ECSCW, Sep. 1991, pp. 6-10.
Hiroshi Ishii et al, "Toward an Open Shared Workspace: Computer and Video Fusion Approach of Team Workstation," Communications of the ACM, Dec. 1991, vol. 34 No. 12, pp. 37-50.
Hirotada Ueda et al, "Impact: An Interactive Natural-Motion-Picture Dedicated Multi-Media Authoring System," Communications of the ACM, Mar. 1991, pp. 343-350.
Hofmann, Neumann, Oberlies & Schadwinkel, "Videotext Programmiert Videorecorder," Rundfunktechnischen Mitteilungen, (Broadcast Engineering Reports), vol. 26 No. 6, pp. 254-257, Nov.-Dec. 1982.
Installation Guide, "Getting Started 1" Manual, and Remote Control "Quick Reference Guide".
Instructional Manual, "Sonic the Hedgehog," Sega of America, 1992.
"Interactive Computer Conference Server," IBM Technical Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.

James Sorce, David Fay, Brian Raila and Robert Virzi, "Designing a Broadband Residential Entertainment Service: A Case Study," GTE Laboratories Incorporated, undated, pp. 141-148.
James, A., "Oracle—Broadcasting the Written Word," Wireless World, Jul. 1973, vol. 79 No. 1453, pp. 314-316.
Judice, C.N., "Move Over Cable, Here Comes Video Via Voice Lines," Network World, Sep. 1986, p. 26.
Karstad, K.,"Microprocessor Control for Color-TV Receivers," IEEE Transactions on Consumer Electronics, vol. CE-26, May 1980, pp. 149-155.
Kornhaas, W., "Von der Textprogrammierung uber TOP zum Archivsystem,".
Radio Fernsehen Elektronik, vol. 40, No. 8, Aug. 30, 1991, pp. 465-468, XP 000240875 Veb Verlag Technik. Berlin, DE ISSN: 1436-1574.
Listing of computer code for operating system within the Cable Computer in 1985 (Plaintiffs Exhibit 298).
Listing of computer code for Video HTU Program (Plaintiffs Exhibit 299).
"Lists> What's on Tonite! TV Listings (fwd)," Internet article (On line), Jan. 28, 1995, XP 002378869 [Retreived on Apr. 28, 2006].
Lowenstein, R.L. and Aller, H.E., "The Inevitable March of Videotex," Technology Review, vol. 88, Oct. 1985, p. 22.
M/A-COM, Inc., "Videocipher 11 Satellite Descrambler Owners Manual," dated Feb. 1986, pp. 1-24.
Mack Daily, "Addressable Decoder with Downloadable Operation," Proceedings from the Eleven Technical Sessions, 42nd Annual Convention and Exposition of the NCTA, Jun. 6-9, 1993, pp. 82-89.
Mannes, G., "Smart Screens: Development of Personal Navigation Systems for TV Viewers," Video Magazine, Dec. 1993.
Mar. 19, 1985 letter from G. Knapp of CableData to R. Hansen of Weststar Communications, Inc. (Plaintiffs Exhibit 325).
Markowitz, A. "Companies Jump on Interactive Bandwagon," Discount Store News, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83 No. 1, pp. 6-10.
Merrell,R.G., "Tac Timer," 1986 NCTA Technical Papers, pp. 203-206.
"MSI Datacasting Systems," TV Communications Journal, Jan. 1973.
Neumann, Andreas, "WDR Online Aufbau and Perspektiven Automatisierter Online-Dienste im WDR," RTM Rundfunktechnische Mitteilungen, vol. 41, pp. 56-66, Jun. 1997.
No subject, "Tom Schauer (tschauer@moscow.com)Thu, Sep. 28, 1995 16:46:48-700," XP-002378870 [Retrieved from the Internet Apr. 28, 2006].
Office Action dated Sep. 8, 2006 re U.S. Appl. No. 10/453,388.
"Open TV fur interaktives Fernsehen," Trend and Technik, 9-95 RFE, p. 100. (English language translation attached).
"Open TV Launches OpenStreamer™ Technology for Broadcasters to Deliver First Ever Real-Time Digital Interactive Television," from the internet at http://www.opentv.corninewsiopenstreamer press final htm, printed on Jun. 28, 1999, the document bears a copyright date of 1999.
Pfister, Larry T., "Teletext: Its Time Has Come," Prepared for the IGC Videotext / Teletext Conference, Andover, Massachusetts, Dec. 14, 1982, pp. 1-11.
Prevue Guide Brochure, Spring 1994.
"Prevue Networks and OpenTV(R) Agree to Work Together on Deploying Interactive Program Guides Worldwide," from the internet at http://www.opentv.corninews/prevuefinal.htm, printed on Jun. 28, 1999.
"Probe XL Brochure, Auto Tote Systems Inc.," (Newark, Delaware) (undated) 57 pgs.
Prodigy Launches Interactive TV Listing, Apr. 22, 1994 public Broadcasting Report.
Rayers, D.J., "Telesoftware by Teletext," 1984 IEEE Conference Papers, vol. 240, p. 323.
"Rewind, reply and unwind with new high-tech TV devices," by Lawrence J. Magid, LA Times. This document was printed from the internet on Jun. 6, 1999 and bears a date of May 19, 1999.

(56) References Cited

OTHER PUBLICATIONS

Rogers, "Telcos vs. Cable TV : The Global View With Markets Converging and Regulatory Barriers Falling, Service Carriers Are Ready to Rumble,"Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Ross Peddicord, "New on TV: You Bet Your Horse," The Sun, Baltimore Maryland, Dec. 15, 1994, 1 pg.
Schlender, B.R., "Couch Potatoes! Now Its Smart TV," Fortune, Nov. 20, 1989, pp. 111-116.
Schmuckler, Eric "A marriage that's made in cyberspace (television networks pursue links with online information services)," May 16, 1994 Mediaweek, v. 4, No. 20, p. 22(3).
Sealfon, Peggy, "High Tech TV," Photographic,Dec. 1984.
"StarSight Interactive Television Program Guide III" Jim Leftwich and Steve Schein, Functional/ Interactional Architecture Specification Document, Orbit Interaction, Palo Alto, California, Published before Apr. 19, 1995.
"StarSight Interactive Television Program Guide IV" Jim Leftwich and Steve Schein, Functional/ Interactional Architecture Specification Document, Orbit Interaction, Palo Alto, California, Published before Apr. 19, 1995.
Sunada, K. et al, "Teletext Color Television Receiver Model C-29M950, C26M940," NEC Home Electronics , NEC Giho, 1987.
Sussman, A. "GTE Tunes in to Home TV Shopping," PC Week, Jun. 28, 1988, p. C15.
Tech Notes: Product Updates from M/A-COM Cable Home Group, "Videocipher Owners Manual Update," Issue No. 6, Feb. 1986.
Technical White Paper, "Open TV™ Operating Environment," (CD 1998 OpenTV Inc.), pp. 1-12.
Technological Examination & Basic Investigative Research Report on Image Databases, Japan Mechanical Engineering Organization Intl Society for the Advancement of Image Software, Japan, Mar. 1988.
Technology: Turn on, tune in and print out—An experimental interactive television service is set to alter our viewing habits, Financial Times (London), Oct. 14, 1993, p. 11.
The New Media and Broadcast Policy: An Investigation & Research Conference Report on Broadcasting Diversification, Radio Regulatory Bureau, Japan Ministry of Posts & Telecommunications, Mar. 1982.
Transcript of the Deposition of John Roop, Oct. 1996, pp. 186-187.
Trial testimony of Michael Axford, Prevue Interactive, Inc. and United Video Satellite Group, Inc. v. Starsight Telecast, Inc., May 9, 1998, pp. 186-187, 295-315, and 352-357.
"TV Guide Online Set for Fall", Entertainment Marketing Letter, Aug. 1994.
"TV Listings Functional Spec.," Time Video Information Services, Inc., undated.
"Using StarSight 2," Instruction Manual, StarSight Telecast, Inc., Starsight CB 1500 Customer Letter, 1994.
UV-133 Cont. 6 Declaration Under 37 C.F.R. § 1.132 of Richard E.Glassberg, signed Oct. 20, 2006, filed Oct. 24, 2006.
Various publications of Insight Telecast, 1992 and 1993.
Veith, R.H., "Television's Teletext," Elsevier Science Publishing Co., Inc, 1983, pp. 13-20, 41-51.
Videocipher Stipulation, May 1996.
VideoGuide, "VideoGuide User's Manual," pp. 1-28 (p. 11 is the most relevant).
W. Leo Hoarty, "Multimedia on Cable Television Systems," Symposium Record Table TV Sessions, 18th International Television Symposium and Technical Exhibition, Montreux, Switzerland, Jun. 10, 1993, pp. 555-567.
Windows 98 Feature Combines TV, Terminal and the Internet, New York Times, Aug. 18, 1998.
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.
Yee Hsiang Chang et al., "An Open-Systems Approach to Video on Demand," IEEE Communications Magazine, May 1994, pp. 68-80.

\* cited by examiner

68

| CHANNEL | TIME | DATE | TITLE |
|---|---|---|---|
| | | PPV LISTINGS - BY TITLE | |
| REQ 1 | 7:30 PM | 9/12 | PROGRAM |
| REQ 4 | 6:00 AM | 9/13 | PROGRAM |
| REQ 3 | 7:00 AM | 9/15 | PROGRAM |
| REQ 1 | 3:00 PM | 9/11 | PROGRAM |
| REQ 2 | 4:00 PM | 9/12 | PROGRAM |

PRESS "DOWN" TO VIEW MORE LISTINGS

FIG. 7

| CHANNEL | TIME | DATE | TITLE |
|---------|--------|-------|---------|
| REQ 1 | 9:00PM | 11/3 | EVENT C |
| REQ 1 | 8:00PM | 11/25 | EVENT H |
| REQ 2 | 8:30PM | 11/20 | EVENT A |
| REQ 1 | 9:00PM | 11/15 | EVENT B |

PRESS "DOWN" TO VIEW MORE SPECIAL EVENTS

| LOGO | SPORTS PACKAGES | LOGO |

| DATE(S) | TITLE |
|---|---|
| 3/12 | PACKAGE V |
| 3/12-3/14 | PACKAGE A |
| 3/15 | PACKAGE S |
| 3/14 | PACKAGE G |

INTERACTIVE TELEVISION PROGRAM GUIDE SYSTEM WITH OPERATOR SHOWCASE

BACKGROUND OF THE INVENTION

This invention relates to interactive television program guide systems, and more particularly, to program guide systems that allow television service providers such as cable operators to provide showcases for various types of program offerings.

Cable, satellite, and broadcast television systems provide viewers with a large number of television channels. Viewers have traditionally consulted printed television program schedules to determine the programs being broadcast at a particular time. More recently, interactive electronic television program guides have been developed that allow television program information to be displayed on a viewer's television.

Interactive program guides are typically implemented on set-top boxes. Such program guides allow users to view television program listings in different display formats. For example, a user may instruct the program guide to display a grid of program listings organized in a channel-ordered or a time-ordered list. Users may also search and sort program listing by theme (e.g., movies, sports, etc.) or by title (i.e., alphabetically). A user may view additional information on a program by placing a highlight region on a desired program listing and pressing an "info" button. The user may purchase a pay program from the program guide by placing the highlight region on a program listing and pressing an "OK" button.

Although a user is often able to find information on a program of interest by searching for the program with the tools available in the program guide (e.g., by searching for listings in a particular category), this process requires that the user take an active role in locating the information. If a user desires a more passive experience, the user may not venture beyond the display screens in the program guide that present simple time-ordered lists of program information. As a result, the user may not be made aware of many of the cable system operator's offerings.

It is therefore an object of the present invention to provide an interactive television program guide that enhances the ability of a service provider to supply users with information on the programming available from the service provider.

SUMMARY OF THE INVENTION

This and other objects of the invention are accomplished in accordance with the principles of the present invention by providing an interactive television program guide that allows a service provider such as a cable system operator, satellite system operator, or broadcast system operator to customize the type of television listings that are made available to the user in the form of an operator showcase. The operator showcase may be accessed by the user through a menu of television display screen options each of which corresponds to a different operator showcase television listings screen. For example, a television display screen option might be "sports packages" and the corresponding television listings screen might therefore contain a set of television listings on various available packages of sports programming that are available for purchase. Because the television listings screens are easily accessible in a central location in the program guide menu structure, the operator showcase provides an attractive way for the service provider to promote programming.

The service provider may brand the operator showcase by selecting a title and logos for each operator showcase television listings screen. In addition, the set of television listings information that is displayed in a given television listings screen is determined based on content criteria that are preselected by the service provider. The program guide uses the content criteria to query a database of television listings data periodically provided to the set-top box from a program guide database in a main facility. The results of the database query (i.e., the set of television listings information that satisfy the content criteria) are displayed in the operator showcase television listings screen.

The service provider may also select the format for each operator showcase television listings screen. For example, the service provider may select the format of a time-ordered list, a channel-ordered, list, an alphabetically-ordered list, or a display format containing a promotional video barker, etc.

A user may select a given item from the set of television listings information. For example, the user may position a highlight region on top of a program listing using cursor buttons on a remote control. Pressing an "info" button on the remote control directs the program guide to display additional information on the selected item. Pressing an "order" button directs the program guide to provide the user with an opportunity to purchase the selected item.

Further features of the invention, its nature and various advantages will be more apparent from the accompanying drawings and the following detailed description of the preferred embodiments.

BRIEF DESCRIPTION OF THE DRAWINGS

FIG. 7 is a view of an illustrative operator showcase television listings screen for displaying pay programs in an alphabetically-ordered list in accordance with the present invention.

FIG. 8 is a view of an illustrative operator showcase television listings screen for displaying special events in accordance with the present invention.

FIG. 11 is a view of an illustrative operator showcase television listings screen for displaying packages of sports programming in accordance with the present invention.

DETAILED DESCRIPTION OF THE PREFERRED EMBODIMENTS

Figure 1:
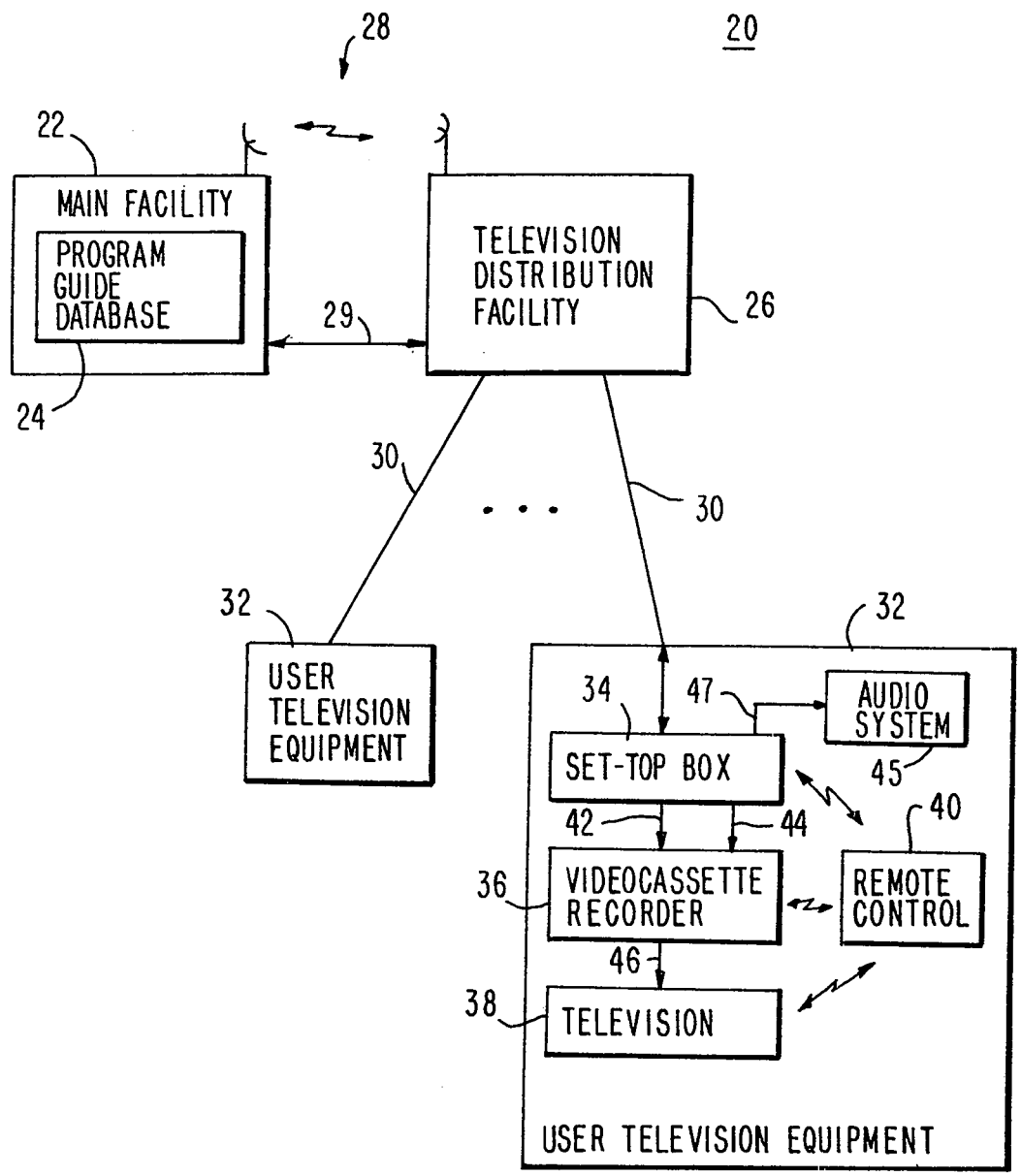
FIG. 1 is a schematic diagram of an interactive program guide system in accordance with the present invention.

An illustrative program guide system 20 in accordance with the present invention is shown in FIG. 1. Main facility 22 provides television program data from program guide database 24 to television distribution facility 26 via communications link 28. Link 28 may be a satellite link, a telephone network link, a cable or fiber optic link, a microwave link, a combination such links, or any other suitable communications path. If it is desired to transmit video signals (e.g., for promotional videos) over link 28 in addition to data signals, a relatively high bandwidth link such as a satellite link may generally be preferred to a relatively low bandwidth link such as a telephone line. Information from television distribution facility 26 may be provided to main facility 22 via communications link 29. An illustrative communications link 29 is a modem link over a telephone network. Television distribution facility 26 may be a cable system headend, a broadcast distribution facility, or a satellite television distribution facility. Television distribution facility 26 is operated by a service provider (e.g., a cable system operator, a satellite television system operator, or a broadcast television system operator).

The program data transmitted by main facility 22 to television distribution facility 26 includes television program listings data such as program times, channels, titles, descriptions, etc. Transmitted program data also includes pay program data such as pricing information for individual programs, subscription channels, and packages, time windows for ordering programs, channels and packages, telephone numbers for placing orders that cannot be impulse ordered, etc. If desired, some of this data may be provided using data sources at facilities other than main facility 22. For example, data related to pay program order processing (e.g., billing data and the like) may be generated by an order processing and billing system that is separate from television distribution facility 26.

Television distribution facility 26 distributes the program data to multiple users via communications paths 30. Each user has user television equipment 32. Program data may be distributed to user television equipment 32 periodically (e.g., once each week). Television distribution facility 26 may also poll user equipment 32 periodically for certain information (e.g., pay program account information or information regarding programs that have been purchased and viewed using locally-generated authorization techniques).

User television equipment 32 typically contains equipment such as set-top box 34, an optional videocassette recorder 36, and television 38. Set-top box 24 may be controlled by remote control 40 or other user input interface such as a wireless keyboard, mouse, trackball, etc.

Set-top box 34 contains a microprocessor and other circuitry for executing instructions to support an interactive television program guide with pay-per-view services. The program guide may be implemented on set-top box 34 or may be implemented on user television equipment other than a set-top box if desired. For clarity, the present invention will be illustrated in connection with a set-top box implementation.

Communications paths 30 preferably have sufficient bandwidth to allow television distribution facility 26 to distribute scheduled television programming, pay programming, promotional videos, and other video information to user equipment 32 in addition to program data. If desired, program data may be distributed by one or more distribution facilities that are similar to but separate from television distribution facility 26 using communications paths that are separate from communications paths 30.

Certain functions such as pay program purchasing may require user equipment 32 to transmit data to distribution facility 26 over communications paths 30. If desired, such data may be transmitted over telephone lines or other separate communications paths (not shown). If functions such as these are provided using facilities separate from television distribution facility 26, some of the communications with user equipment 32 may be made directly to the separate facilities.

Multiple television and audio channels (analog, digital, or both analog and digital) may be provided to set-top box 34 via communications path 30. The television channels may include normal television channels, pay programming channels, and channels used to transmit promotional videos. During normal television viewing, the user tunes set-top box 34 to a desired one of these channels. The signal for that television channel may be provided at video output 42 as a radio-frequency (RF) signal on a predefined channel (e.g., channel 3 or 4) or as a demodulated video signal. The video signal at output 42 is received by optional videocassette recorder 36, so that the user may record programs. Program recording and other features may be controlled by set-top box 34 using control path 44. Audio signals (e.g., for digital music channels) may be provided to audio system 45 via output 47.

Television 38 may receive RF or demodulated video signals from videocassette recorder 36 via path 46. The video signals on path 46 may either be generated by videocassette recorder 36 when playing back a prerecorded videocassette or may by passed through from set-top box 34. The video signals provided to television 38 may contain real-time video signals for broadcast television programs, pay programs, or promotional videos. For example, if set-top box 34 is tuned to a particular channel, the video signals for that channel may be provided to television 38. Set-top box 34 also displays various program guide screens on television 38, which may contain television listings information and full-screen or partial-screen promotional videos.

Remote control 40 may have cursor keys, an "enter," "select," or "OK" button, a "guide" button, a "record" button, an "info" button, and various other control buttons. When the user presses the "guide" button, set-top box 34 invokes the interactive program guide and displays an appropriate screen of programming listings on television 38.

A typical program guide display is a grid or other suitable table or list of television program listings. Rows of listings may be associated with different television channels and columns may be associated with different scheduled broadcast times for the programs (e.g., 9:00 PM, 9:30 PM, and 10:00 PM).

Grids or tables of program listings and other program guide services may be accessed using any suitable technique. For example, set-top box 34 may provide a menu on television 38 such as menu 48 shown in FIG. 2. In menus such as menu 48 of FIG. 2 and other program guide display screens, a highlight region such as highlight region 50 may be used to define the current position of the user. The user may position highlight region 50 using the cursors on remote control 40 (FIG. 1) and may make menu selections by pressing the "OK" button or a similar button. With menu 48, a user can select from the menu options "program listings" to view television program listings information, "messages" to view messages from the cable system operator, "favorites" to enter a set-up routine related to user preferences, and "operator showcase" (this label is configurable by the operator) to view customized display screens containing television program listings and promotional videos.

If desired, the functions of the dedicated "OK," "guide," "record," and "info" buttons and various other control buttons on remote control 40 may be provided in the form of suitable menu options that the user may select using the cursor keys and a button such as the "OK" button. In addition, other dedicated buttons may be provided on remote control 40 if desired.

Figure 2:
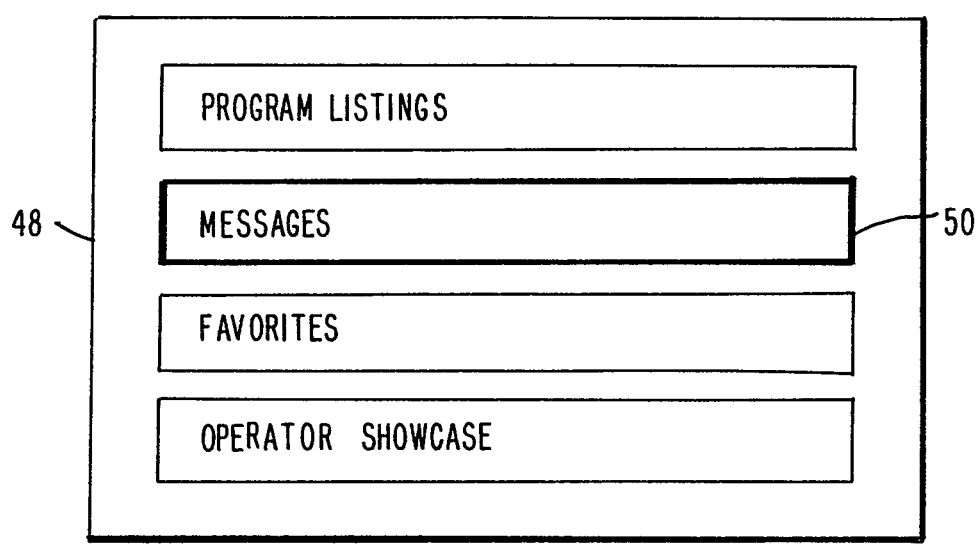
FIG. 2 is a view of a display screen containing an illustrative menu for selecting among various program guide options in accordance with the present invention.
Figure 3:
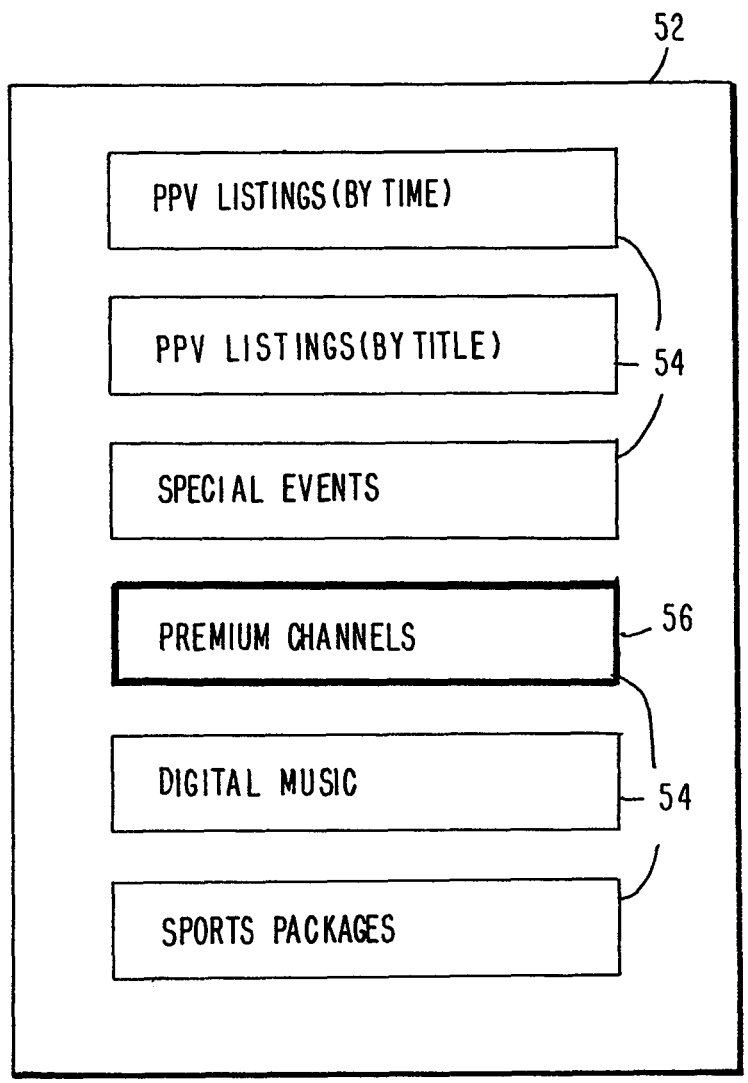
FIG. 3 is a view of a display screen containing an illustrative operator showcase menu in accordance with the present invention.

When a user selects the option "operator showcase" from menu 48 of FIG. 2, a menu such as operator showcase menu 52 of FIG. 3 may be displayed. If desired, operator showcase menu 52 may be integrated into menu 48 so that no user selection from menu 48 is required to view menu 52. Operator showcase menu 52 provides the user with an opportunity to select one of a number of television display screen options 54 using highlight 56. Each television display screen option 54 is associated with a customized operator showcase television listings screen. The display screen options 54 shown in FIG. 3 are illustrative only. Any suitable type of television display screen options may be provided. Display screen options 54 may be configured by the operator as desired.

Because the operator showcase television listings screens may all be accessed through the "operator showcase" option in menu 48, the operator showcase television listings screens provide a centralized location in the program guide menu structure in which the user may obtain a large amount of information about the service provider's programming (particularly pay programming).

Figure 4:
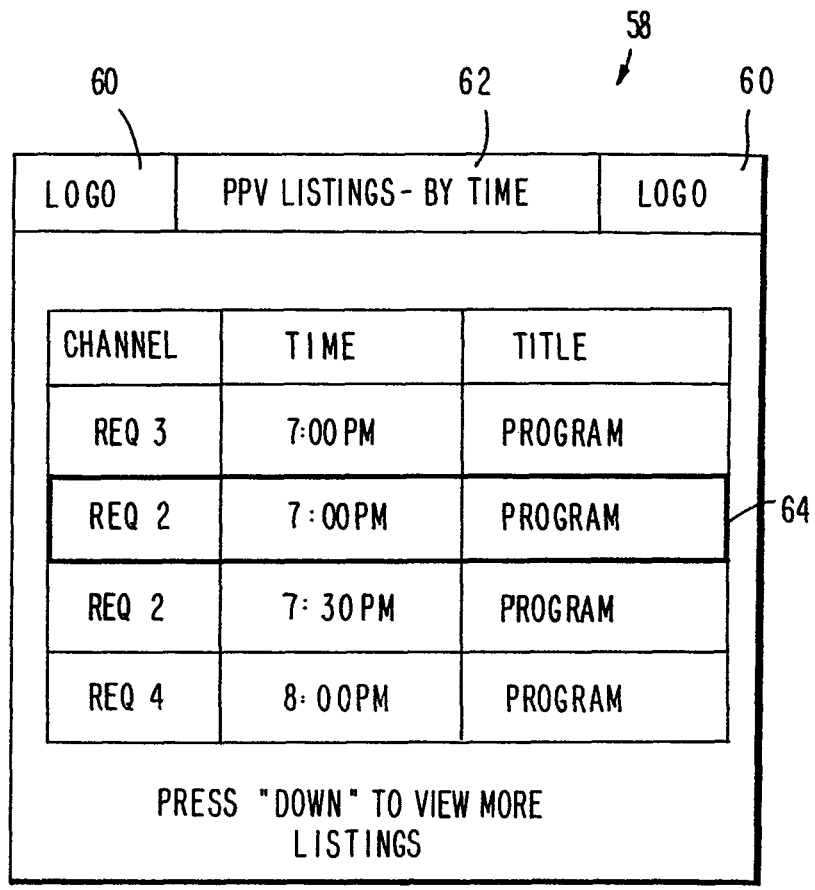
FIG. 4 is a view of an illustrative operator showcase television listings screen for displaying pay programs in a time-ordered list in accordance with the present invention.

If the user selects the display screen option 54 entitled "PPV listings (by time)," the program guide displays a time-ordered list of pay-per-view television programs, as shown in operator showcase television listings screen 58 of FIG. 4. Television listings screen 58 and the other television listings screens associated with the operator showcase television display screen options 54 may each be provided with logos 60 and a title 62 selected by the service provider. Logos allow the service provider to brand the television listings screens. Titles allow the service provider to label the television listings screens.

Figure 5:
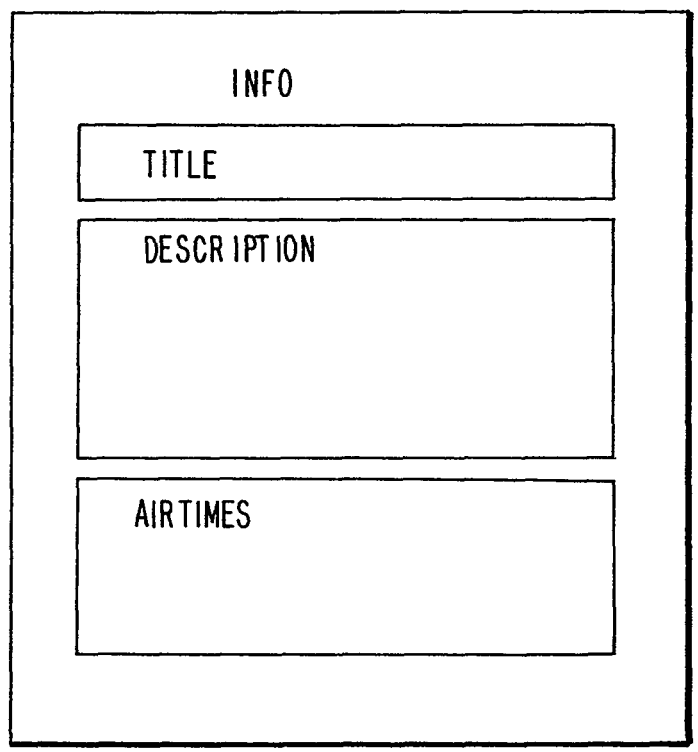
FIG. 5 is a view of an illustrative display screen containing additional information on a selected item from a set of television listings information in an operator showcase television listings screen in accordance with the present invention.

The user may select a pay program from the displayed list of pay programs in television listings screen 58 using highlight region 64. Once highlight region 64 has been placed on a given program listing (e.g., using cursor keys), pressing the "info" button directs the program guide to display additional information on the selected program. The additional information may be displayed using information display screen 66 of FIG. 5. Information display screen may contain any suitable information on the selected listing, such as a program title, program description, ratings information, reviews, etc. Pressing the "info" button when the highlighted item is a subscription channel or a package of pay programs or channels directs the program guide to display an information screen that contains additional information on that channel or package.

Figure 6:
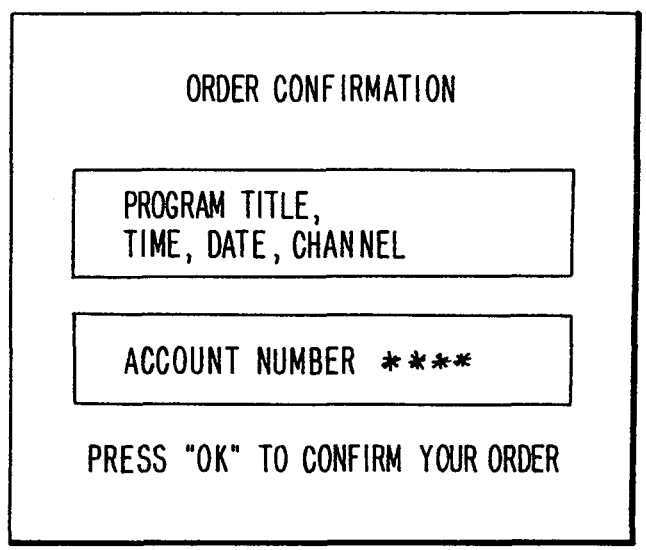
FIG. 6 is a view of an illustrative display screen used to confirm the purchase of a selected item from a set of television listings information in an operator showcase television listings screen in accordance with the present invention.

If the user presses the "OK" button after highlighting a program on television listings screen 58 of FIG. 4, the program guide may display one or more menus that provide the user with an opportunity to confirm the purchase of the selected program. Typically, such menus contain the channel, scheduled broadcast date and time, and price for the selected program. These menus provide the user with an opportunity to enter a personal identification number (PIN) or other account information and typically provide the user with another opportunity to press "OK" to confirm purchase of the program. One such illustrative order confirmation menu is shown in FIG. 6, but any other suitable menu or menus may be used to confirm the user's purchases if desired.

Another type of operator showcase television listings screen that may be provided is shown in FIG. 7. Television listings screen 68 of FIG. 7 contains an alphabetically-ordered list of pay programs. Television listings screen 68 may be accessed by the user by selecting the television display screen option 54 entitled "PPV listings (by title)" of FIG. 3.

If the user selects the television display screen option 54 entitled "special events," the program guide may display special events operator showcase television listings screen 70 of FIG. 8. The title "special events" is displayed in title block 72 and logos are displayed in logo regions 74. The listed special events typically include pay events such as special sporting events, important boxing matches, wrestling matches, playoffs, championship games, concerts, awards programs, special interest programs, etc. Information on the time, date, and channel of the listed events may also be provided. The user may view additional information on the items listed in a television listings screen using cursors or other suitable arrangement to scroll to an item that is lower in the list.

Figure 9:
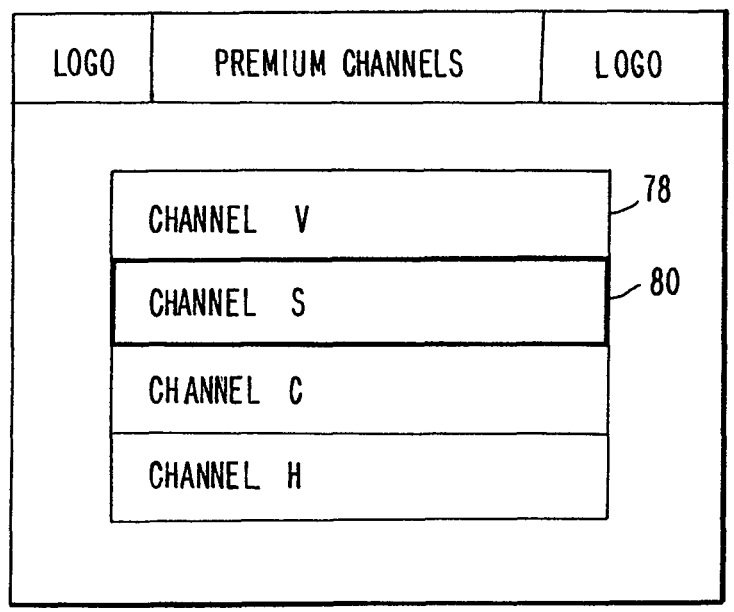
FIG. 9 is a view of an illustrative operator showcase television listings screen for displaying premium channels in accordance with the present invention.

An operator showcase television listings screen 76 that is suitable for promoting subscription television channels is shown in FIG. 9. The program guide displays television listings screen 76 when the user selects the television display screen option 54 in FIG. 3 entitled "premium channels." Television listings screen 76 includes a list 78 of various television channels to which the user may subscribe (e.g., on a monthly basis). The user can select a given channel using highlight region 80. Pressing the "info" button directs the program guide to display additional information on the selected channel. Pressing the "OK" button causes the program guide to display various order menus so that the user may confirm the purchase of a subscription to the selected channel.

Figure 10:
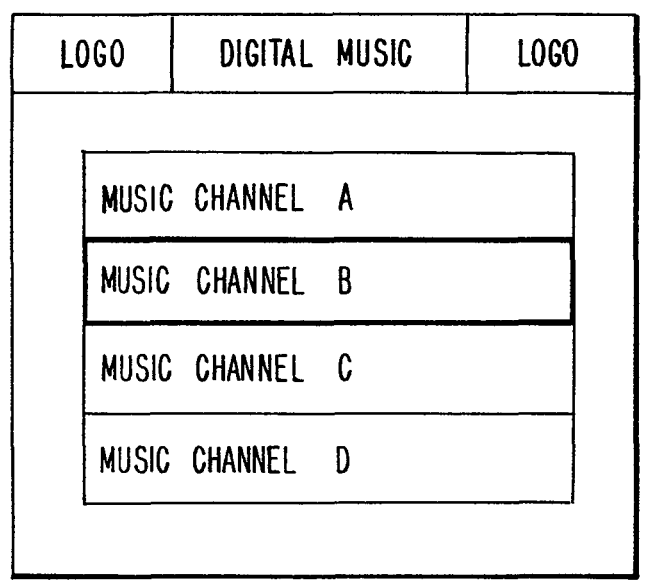
FIG. 10 is a view of an illustrative operator showcase television listings screen for displaying digital music channels in accordance with the present invention.

Another television display screen option 54 in FIG. 3 that may be selected is the option entitled "digital music." If the user selects the digital music option, a display screen such as operator showcase television listings screen 82 of FIG. 10 may be displayed on television 38. The user may select a given music channel using highlight region 84. The user may view additional information on the selected channel by pressing the "info" key. A subscription to the selected channel may be purchased by pressing the "OK" button and confirming purchase of the channel. After the user has purchased the desired music channel, set-top box 34 provides music that is played on audio system 45.

Sometimes programs or channels are made available to the user as part of a package. Various package types may be supported by the program guide. For example, pay programming may be provided in a "time block" package that allows a user to purchase a block of time on a particular channel, a "pay-per-day" package that includes multiple consecutive airings of a single program, a "special events" package that includes multiple components of special programming events, a "season ticket" package that includes all sports programs of a specific league or team for the duration of the sports season, a "premium multiplex" package that includes authorization for more than one premium subscription channel, an "a la carte" package that may includes authorization for a selectable subset of a number of subscription channels, etc.

When the user selects the television display screen option 54 of FIG. 3 entitled "sports packages," the user may be presented with operator showcase television listings screen 84 of FIG. 11. Television listings screen 84 may contain a list of dates and package titles for various sports packages that are available from the service provider. A user may select a desired package using highlight region 86. Pressing the "info" button directs the program guide to provide additional information on the selected package. Pressing the "OK" button directs the program guide to display ordering menus so that the user may purchase the package.

The television listings screens of FIGS. 4-11 are illustrative only. The actual screens used will depend upon the configuration options selected by the operator.

Figure 12:
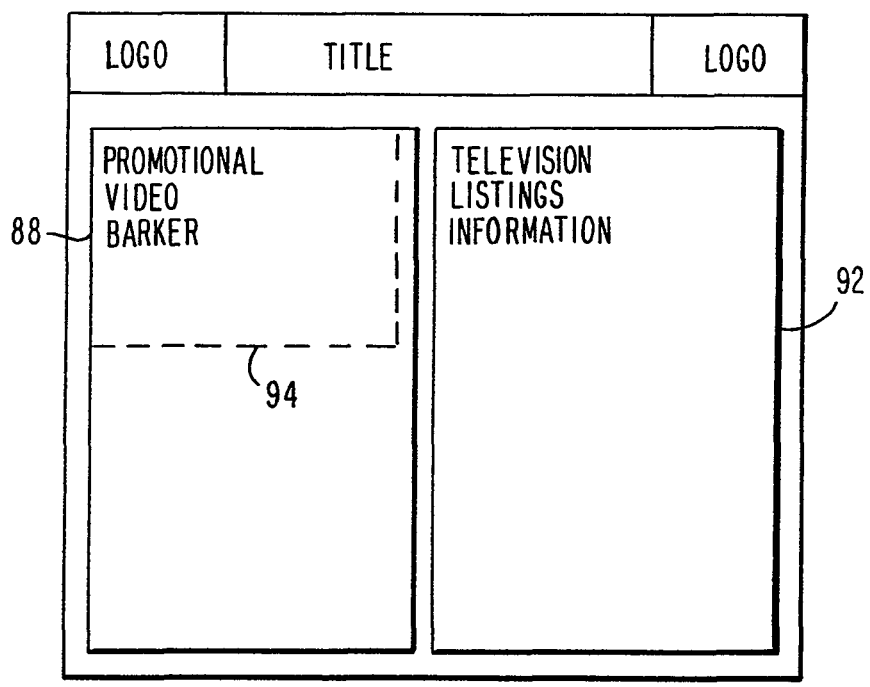
FIG. 12 is a view of an illustrative operator showcase television listings screen in which a promotional video barker and a set of television listings information are simultaneously displayed.

If desired, video may be displayed in an operator showcase television listings screen. For example, a promotional video barker 88 may be provided in an operator showcase television listings screen 90, as shown in FIG. 12. Television listings information 92 may be simultaneously displayed. Television listings information 92 may be program listings, subscription channel listings or listings for packages of programs or channels. The content of promotional video barker 88 is typically related in some way to the content of television listings information 92. For example, if television listings information contains a list of subscription channels that are available, promotional video barker 88 may contain promotional video clips of movies that are scheduled to be broadcast on those channels in the next month.

Figure 13:
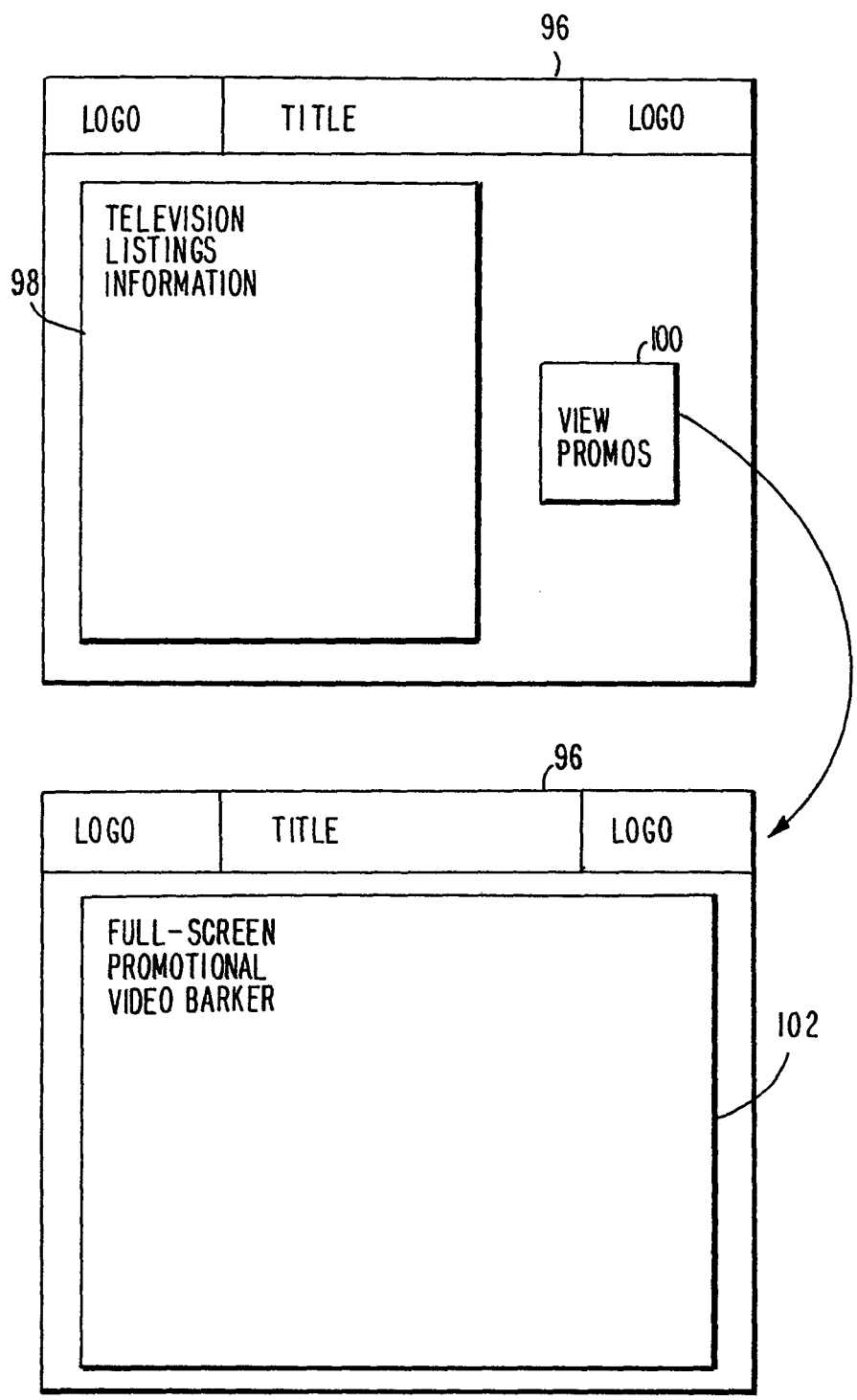
FIG. 13 is a view of a of an illustrative operator showcase television listings screen showing how a full-screen promotional video barker may be provided upon selecting a "view promos" option.

The service provider may configure the size of promotional video barker 88. For example, a quarter-screen promotional video barker 94 may be used in place of half-screen promotional video barker 88 if desired. A full-screen promotional video barker may be provided using the arrangement shown in FIG. 13. Initially, television listings screen 96 of FIG. 13 contains television listings information 98 and "view promos" option 100. Television listings information 98 may contain program listings, listings of subscription channels, or listings of packages of programs or channels. When the viewer selects "view promos" option 100 (or presses "OK" in response to a suitable prompt), the program guide displays full-screen promotional video barker 102 in place of television listings information 98 and "view promos" option 100.

The title, logos, content, and format of the operator showcase television listings screens may be customized by each service provider to accommodate the promotional needs of that service providers. The content of the listings in a given operator showcase television listings screen may be determined based on content criteria that have been selected by the service provider. The program guide maintains a database of current television listings data in memory in set-top box 34. When the user selects a television display screen option, the program guide uses the content criteria in a database query to generate a set of television listings information for the corresponding television listings screen.

For example, when the user selects a television display screen option entitled "sports packages," the program guide queries the database for all listings meeting the content criteria "sports" and "packages." Illustrative content criteria include children's programming, sporting events, instructional programming, pay-per-view programming, packages, channels, programs, premium programming, programming on a la carte channels, movies, documentaries, special events, or programming airing on a specified list of channels, etc. On a screen that lists channels, the operator may choose to show premium channels, a la carte channels, basic channels, video channels, audio channels, a specified list of channels, etc. These content criteria are illustrative only. Any other suitable content criteria may be used if desired.

The listings satisfying the content criteria selected by the service provider may be displayed in an operator showcase television listings screen according to a preselected format. For example, the television listings screens for sports packages may contain listings for sports packages in a time-ordered list without an accompanying promotional video barker. Illustrative listings formats include by-time ordering, by-channel ordering, alphabetical ordering, listings with and without accompanying promotional video barkers, listings with different sizes of promotional video barkers, listings screens with and without logos, titles, etc. Any other suitable listings formats may be used if desired.

Figure 14:
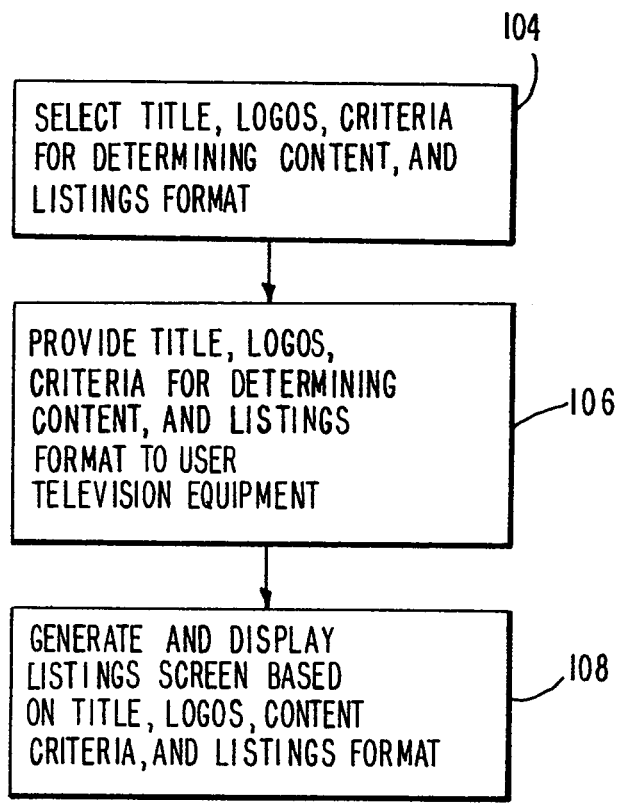
FIG. 14 is a flow chart of steps involved in defining an operator showcase television listings screen by selecting a title, logos, content criteria, and format.

Steps involved in customizing the operator showcase television listings screens are shown in FIG. 14. At step 106, the service provider selects various titles and logos to be used to brand the television listings screens. The service provider also selects the content criteria that are to be used to query the set-top box database when generating the sets of television listings information that will appear in the television listings screens. In addition, the service provider selects the formats to be used to display the various listings.

At step 106, the title, logos, content criteria, and display formats that were selected by the service provider for the operator showcase television listings screens are provided to set-top box 34 in user television equipment 32. The selections of the service provider may be provided to set-top box 34 using any suitable technique. For example, the selections of the service provider may be provided to main facility 22 on a diskette and incorporated into program guide database 24. Main facility 22 may then transmit the selections from program guide database 24 to television distribution facility 26, which may distribute the selections to various set-top boxes 34. Alternatively, the selections of the service provider may be provided directly to television distribution facility 26, from which they may be distributed to set-top boxes 34. These approaches are illustrative only and any other suitable technique for providing the selections of the service provider to the user television equipment may be used if desired.

When a user selects a given television display screen option, a corresponding operator showcase television listings screen is generated at step 108 based on the title, logos, content criteria, and listings format provided to set-top box 34 in step 106. The set of television listings information in the television listings screen is generated at step 108 using the content criteria selected by the service provider to perform a database query on the database of television listings data stored in set-top box 34.

The foregoing is merely illustrative of the principles of this invention and various modifications can be made by those skilled in the art without departing from the scope and spirit of the invention.

What is claimed is:

1. A method of presenting program listings information, the method comprising:
   receiving, at user equipment, a list of one or more customized display screens from a service provider, wherein each of the one or more customized display screens is associated with content criteria from the service provider, wherein each of the content criteria identifies programs that the service provider wishes to promote, wherein a first of the customized display screens arranges program information according to a first format and a second of the customized display screens arranges program information according to a second format, wherein the first format defines a first size for a display element, and wherein the second format defines a second size for the display element, the first size being different from the second size;
   generating for display, at the user equipment, the list of the one or more customized display screens;
   receiving a user selection of the first customized display screen from the list of the one or more customized display screens;
   in response to receiving the user selection of the first customized display screen, searching a database of program listings information for programs that are associated with the content criteria received associated with the selected customized display screen to generate a list of programs for the selected first customized display screen, wherein the list of programs is undetermined prior to the searching; and
   simultaneously generating for display the list of programs corresponding to the selected first customized display screen with a promotional video that includes media content related to the list of programs, wherein the list of programs are arranged according to the first format, and wherein a size of the promotional video corresponds to the first size.

2. The method of claim 1 wherein a format for presenting the program listings information is selected by the service provider.

3. The method of claim 1 wherein titles presented on the display are selected by the service provider.

4. The method of claim 1 wherein logos presented on the display are selected by the service provider.

5. The method of claim 1 further comprising receiving a user selection of an item in the presented display.

6. The method of claim 1 further comprising:
   receiving a user selection of an item in the presented display; and
   receiving a user request for additional information on the selected item.

7. The method of claim 1 further comprising:
   receiving a user selection of an item in the presented display; and
   receiving a user request to purchase the selected item.

8. The method of claim 1 wherein one of the content criteria is pay programming.

9. The method of claim 1 wherein one of the content criteria is packages.

10. The method of claim 1 wherein one of the content criteria is channels.

11. The method of claim 1 wherein one of the content criteria is programs.

12. The method of claim 1 wherein one of the content criteria is sports programming.

13. The method of claim 1 wherein the searching comprises automatically searching the database of program listings information for programs based on a database query, generated at the user equipment, containing the content criteria received associated with the selected customized display screen.

14. The method of claim 1, wherein the promotional video is a promotional video barker.

15. The method of claim 1, wherein each of the one or more customized display screens has a different look and feel.

16. A system for presenting program listings information, the system comprising user television equipment configured to:
   receive a list of one or more customized display screens from a service provider, wherein each of the one or more customized display screens is associated with content criteria received from the service provider, wherein each of the content criteria identifies programs that the service provider wishes to promote, wherein a first of the customized display screens arranges program information according to a first format and a second of the customized display screens arranges program information according to a second format, wherein the first format defines a first size for a display element, and wherein the second format defines a second size for the display element, the first size being different from the second size;
   generate for display the list of the one or more customized display screens;
   receive a user selection of the first customized display screen from the list of the one or more customized display screens;
   search, in response to receiving the user selection of the first customized display screen, a database of program listings information for programs that are associated with the content criteria associated with the selected customized display screen to generate a list of programs for the selected first customized display screen, wherein the list of programs is undetermined prior to the search; and
   simultaneously generate for display the list of programs corresponding to the selected first customized display screen with a promotional video that includes media content related to the list of programs, wherein the list of programs are arranged according to the first format, and wherein a size of the promotional video corresponds to the first size.

17. The system of claim 16 wherein a format for presenting the program listings information is selected by the service provider.

18. The system of claim 16 wherein titles presented on the display are selected by the service provider.

19. The system of claim 16 wherein logos presented on the display are selected by the service provider.

20. The system of claim 16 wherein the user television equipment is further configured to receive a user selection of an item in the presented display.

21. The system of claim 16 wherein the user television equipment is further configured to:
   receive a user selection of an item in the presented display; and
   receive a user request for additional information on the selected item.

22. The system of claim 16 wherein the user television equipment is further configured to:
   receive a user selection of an item in the presented display; and
   receive a user request to purchase the selected item.

23. The system of claim 16 wherein one of the content criteria is pay programming.

24. The system of claim 16 wherein one of the content criteria is packages.

25. The system of claim 16 wherein one of the content criteria is channels.

26. The system of claim 16 wherein one of the content criteria is programs.

27. The system of claim 16 wherein one of the content criteria is sports programming.

28. The system of claim 16, wherein the promotional video is a promotional video barker.

29. The system of claim 16, wherein each of the one or more customized display screens has a different look and feel.

\* \* \* \* \*